United States Patent
Kondo et al.

(10) Patent No.: US 6,912,014 B2
(45) Date of Patent: Jun. 28, 2005

(54) IMAGE PROCESSING DEVICE AND METHOD, AND RECORDING MEDIUM

(75) Inventors: Tetsujiro Kondo, Tokyo (JP); Hideo Nakaya, Kanagawa (JP); Tsutomu Watanabe, Kanagawa (JP); Hideki Ohtsuka, Kanagawa (JP); Yasuaki Takahashi, Kanagawa (JP); Seiji Wada, Tokyo (JP); Takahiro Nagano, Kanagawa (JP); Koji Ohta, Tokyo (JP)

(73) Assignee: Sony Corporation, Tokyo (JP)

( * ) Notice: Subject to any disclaimer, the term of this patent is extended or adjusted under 35 U.S.C. 154(b) by 680 days.

(21) Appl. No.: 09/958,394

(22) PCT Filed: Feb. 8, 2001

(86) PCT No.: PCT/JP01/00895

§ 371 (c)(1),
(2), (4) Date: Feb. 1, 2002

(87) PCT Pub. No.: WO01/59751

PCT Pub. Date: Aug. 16, 2001

(65) Prior Publication Data

US 2003/0030753 A1 Feb. 13, 2003

(30) Foreign Application Priority Data

Feb. 10, 2000 (JP) .................................. 2000-033786

(51) Int. Cl.$^7$ .................................................. H04N 7/01
(52) U.S. Cl. ....................... 348/581; 348/458; 382/275
(58) Field of Search ........................ 348/441, 447, 348/448, 458, 459, 397.1, 398.1, 399.1, 407.1, 409.1; 382/254, 275, 299

(56) References Cited

U.S. PATENT DOCUMENTS

| | | | | |
|---|---|---|---|---|
| 5,852,470 A | * | 12/1998 | Kondo et al. | 348/448 |
| 5,940,544 A | * | 8/1999 | Nako | 382/293 |
| 5,946,044 A | * | 8/1999 | Kondo et al. | 348/458 |
| 6,233,019 B1 | * | 5/2001 | Kondo et al. | 348/458 |
| 6,330,344 B1 | * | 12/2001 | Kondo et al. | 382/107 |
| 6,483,546 B1 | * | 11/2002 | Kondo et al. | 348/458 |
| 6,646,684 B1 | * | 11/2003 | Kondo et al. | 348/447 |
| 6,678,405 B1 | * | 1/2004 | Kondo et al. | 382/159 |
| 6,714,252 B2 | * | 3/2004 | Kondo et al. | 348/458 |

FOREIGN PATENT DOCUMENTS

| | | |
|---|---|---|
| JP | 8-275118 | 10/1996 |
| JP | 9-51510 | 2/1997 |
| JP | 9-74543 | 3/1997 |
| WO | 99/21090 | 4/1999 |

* cited by examiner

Primary Examiner—Michael H. Lee
Assistant Examiner—Paulos M. Natnael
(74) Attorney, Agent, or Firm—Frommer Lawrence & Haug LLP; William S. Frommer

(57) ABSTRACT

An effective pixel area calculating circuit (11) detects position information indicating the position of a target pixel in a frame. A lacking pixel creating circuit (12) determines the class of the target pixel from a plurality of classes in accordance with the position information, then selects a plurality of pixels from an input image signal as a prediction tap, and carries out arithmetic processing based on conversion data obtained in advance by learning for each class and the prediction tap, thus outputting an output image signal of higher quality than the input image signal.

60 Claims, 26 Drawing Sheets

FIG.12(A)

|    | L1    | H1    | H2    | H3 |
|----|-------|-------|-------|----|
| L1 |       | ERROR | q2    | q3 |
| L2 | ERROR | q4    | ERROR | q6 |
| L3 |       | q7    | ERROR | q9 |

FRAME t

FIG.12(B)

|    | H1 | H2 | H3 |
|----|----|----|----|
| L1 | p1 | p2 | p3 |
| L2 | p4 | p5 | p6 |
| L3 | p7 | p8 | p9 |

FRAME t-1

FIG.13

| q1 | q2    | q3 |
| q4 | ERROR | q6 |
| q7 | q8    | q9 |

FRAME t

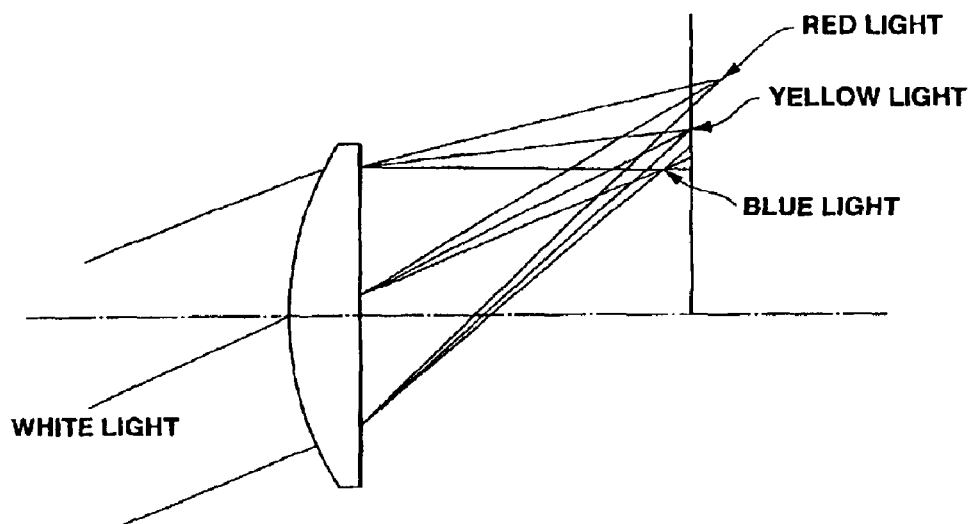
FIG.24
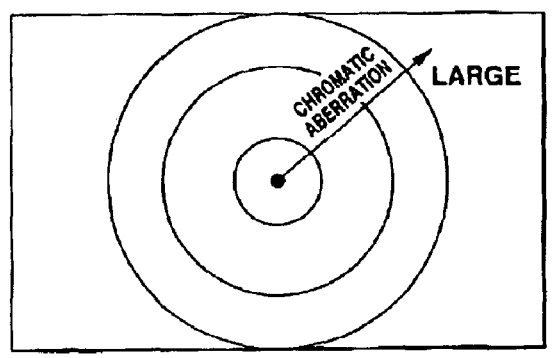
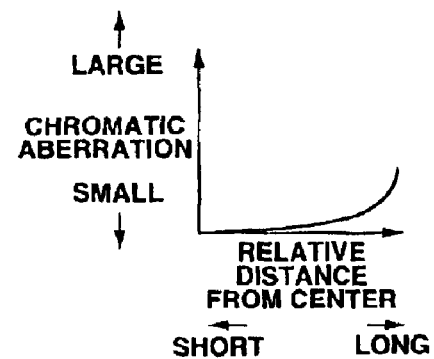
FIG.25(A)　　FIG.25(B)

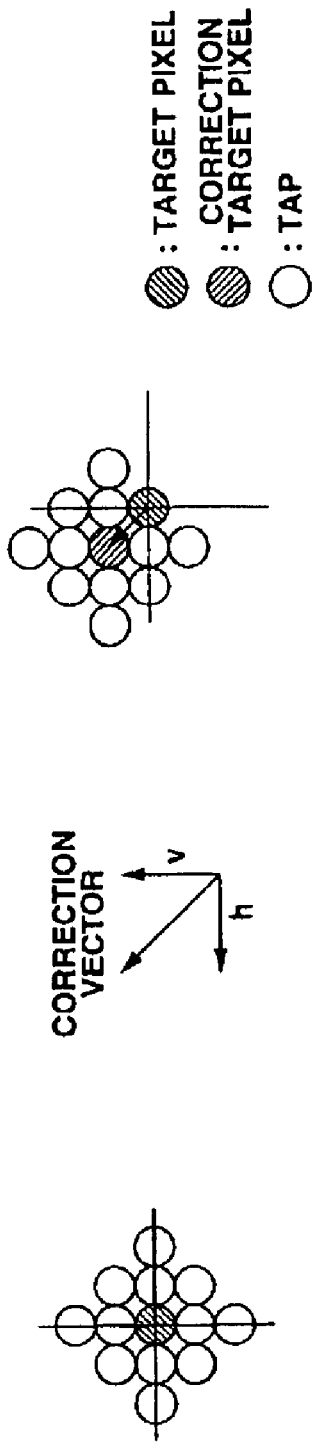

IMAGE PROCESSING DEVICE AND METHOD, AND RECORDING MEDIUM

TECHNICAL FIELD

This invention relates to an image processing device and method and a recording medium, and particularly to an image processing device and method and a recording medium for processing or converting images.

BACKGROUND ART

As a technique for improving the quality such as the resolution of an image signal, for example, classification adaptive processing is employed, which is disclosed in the Japanese Publication of Unexamined Patent Application No. H9-74543 and in the specification of the corresponding U.S. Pat. No. 5,946,044.

In classification adaptive processing, a class tap and a prediction tap for each target pixel of an input image signal are obtained from the input image signal. The target pixel is classified into one of preset classes on the basis of the class tap, and arithmetic operation is carried out using a prediction coefficient set generated in advance by learning for each class, selected correspondingly to the classification, and the prediction tap. Thus, an output image signal having higher quality than the input image signal is generated.

In classification adaptive processing, the class tap and the prediction tap of the pixel might be situated outside the effective range of the image. In this case, there is a high possibility that the pixel outside the effective range does not have a normal pixel value. Therefore, in the conventional classification adaptive processing, the pixel with the class tap and the prediction tap situated outside the effective range of the image is masked as shown in FIG. 1 and thus is not used.

As an example of this classification adaptive processing, a lacking pixel due to failure to correct by an error correcting code or due to packet loss is re-created by classification adaptive processing using the surrounding pixels as a class tap and a prediction tap.

In this case, too, as shown in FIG. 1, the pixel value can be set by classification adaptive processing using the pixel values of the pixels situated around the target pixel.

Conventionally, processing with so-called the same tap structure is carried out using pixels which have relatively similar positional relations with the lacking pixel in the whole screen.

If the pixels situated around the lacking pixel are outside the effective range of the image, the set pixel value is not a normal value. Therefore, the pixels situated on the edges of the resultant image are masked as shown in FIG. 1 and thus are not used.

Moreover, conventionally, similar processing is carried out regardless of the physical positions of pixels on the screen.

When the image is masked, the image is reduced in size and the resolution of the resultant image is substantially lowered. Moreover, since the processing contents are not changed in accordance with the positions of pixels on the screen and similar processing is carried out regardless of the physical positions of pixels on the screen, significant improvement in the quality is not realized.

DISCLOSURE OF THE INVENTION

In view of the foregoing status of the art, it is an object of the present invention to enable constant generation of an image of high quality regardless of the positions of pixels on the screen.

An image processing device according to the present invention comprises: position detecting means for detecting position information indicating the position within a frame, of a target pixel of an input image signal consisting of a plurality of pixels; class determining means for determining the class of the target pixel from a plurality of classes in accordance with the position information; prediction tap selecting means for selecting a plurality of pixels from the input image signal as a prediction tap; and operation means for carrying out arithmetic processing based on conversion data obtained in advance by learning for each of the classes and the prediction tap, thus outputting an output image signal of higher quality than the input image signal.

An image processing method according to the present invention comprises: a position detecting step of detecting position information indicating the position within a frame, of a target pixel of an input image signal consisting of a plurality of pixels; a class determining step of determining the class of the target pixel from a plurality of classes in accordance with the position information; a prediction tap selecting step of selecting a plurality of pixels from the input image signal as a prediction tap; and an operation step of carrying out arithmetic processing based on conversion data obtained in advance by learning for each of the classes and the prediction tap, thus outputting an output image signal of higher quality than the input image signal.

A recording medium according to the present invention has recorded thereon a program for causing a computer to execute image processing, the program comprising; a position detecting step of detecting position information indicating the position within a frame, of a target pixel of an input image signal consisting of a plurality of pixels; a class determining step of determining the class of the target pixel from a plurality of classes in accordance with the position information; a prediction tap selecting step of selecting a plurality of pixels from the input image signal as a prediction tap; and an operation step of carrying out arithmetic processing based on conversion data obtained in advance by learning for each of the classes and the prediction tap, thus outputting an output image signal of higher quality than the input image signal.

An image processing device according to the present invention comprises: position detecting means for detecting position information indicating the position within a frame, of a target pixel of an input image signal consisting of a plurality of pixels; class tap selecting means for selecting a plurality of pixels having their positional relations with the target pixel varied in accordance with the position information, from the input image signal, as a class tap; class determining means for determining the class of the target pixel from a plurality of classes in accordance with the class tap; prediction tap selecting means for selecting a plurality of pixels from the input image signal as a prediction tap; and operation means for carrying out arithmetic processing based on conversion data obtained in advance by learning for each of the classes and the prediction tap, thus outputting an output image signal of higher quality than the input image signal.

An image processing method according to the present invention comprises: a position detecting step of detecting position information indicating the position within a frame, of a target pixel of an input image signal consisting of a plurality of pixels; a class tap selecting step of selecting a plurality of pixels having their positional relations with the target pixel varied in accordance with the position information, from the input image signal, as a class tap; a class determining step of determining the class of the target pixel from a plurality of classes in accordance with the class tap; a prediction tap selecting step of selecting a plurality of pixels from the input image signal as a prediction tap; and an operation step of carrying out arithmetic processing based on conversion data obtained in advance by learning for each of the classes and the prediction tap, thus outputting an output image signal of higher quality than the input image signal.

A recording medium according to the present invention has recorded thereon a program for causing a computer to execute image processing, the program comprising: a position detecting step of detecting position information indicating the position within a frame, of a target pixel of an input image signal consisting of a plurality of pixels; a class tap selecting step of selecting a plurality of pixels having their positional relations with the target pixel varied in accordance with the position information, from the input image signal, as a class tap; a class determining step of determining the class of the target pixel from a plurality of classes in accordance with the class tap; a prediction tap selecting step of selecting a plurality of pixels from the input image signal as a prediction tap; and an operation step of carrying out arithmetic processing based on conversion data obtained in advance by learning for each of the classes and the prediction tap, thus outputting an output image signal of higher quality than the input image signal.

An image processing device according to the present invention comprises: position detecting means for detecting position information indicating the position within a frame, of a target pixel of an input image signal consisting of a plurality of pixels; class tap selecting means for selecting a plurality of pixels from the input image signal as a class tap; class determining means for determining the class of the target pixel from a plurality of classes in accordance with the class tap; prediction tap selecting means for selecting a plurality of pixels having their positional relations with the target pixel varied in accordance with the position information, from the input image signal as a prediction tap; and operation means for carrying out arithmetic processing based on conversion data obtained in advance by learning for each of the classes and the prediction tap, thus outputting an output image signal of higher quality than the input image signal.

An image processing method according to the present invention comprises: a position detecting step of detecting position information indicating the position within a frame, of a target pixel of an input image signal consisting of a plurality of pixels; a class tap selecting step of selecting a plurality of pixels from the input image signal as a class tap; a class determining step of determining the class of the target pixel from a plurality of classes in accordance with the class tap; a prediction tap selecting step of selecting a plurality of pixels having their positional relations with the target pixel varied in accordance with the position information, from the input image signal as a prediction tap; and an operation step of carrying out arithmetic processing based on conversion data obtained in advance by learning for each of the classes and the prediction tap, thus outputting an output image signal of higher quality than the input image signal.

A recording medium according to the present invention has recorded thereon a program for causing a computer to execute image processing, the program comprising: a position detecting step of detecting position information indicating the position within a frame, of a target pixel of an input image signal consisting of a plurality of pixels; a class tap selecting step of selecting a plurality of pixels from the input image signal as a class tap; a class determining step of determining the class of the target pixel from a plurality of classes in accordance with the class tap; a prediction tap selecting step of selecting a plurality of pixels having their positional relations with the target pixel varied in accordance with the position information, from the input image signal as a prediction tap; and an operation step of carrying out arithmetic processing based on conversion data obtained in advance by learning for each of the classes and the prediction tap, thus outputting an output image signal of higher quality than the input image signal.

An image processing device according to the present invention comprises: provisional class tap selecting means for selecting a plurality of pixels from an input image signal as a provisional class tap, for each target pixel of the input image signal consisting of a plurality of pixels; true class tap selecting means for selecting a plurality of pixels having their positional relations with the target pixel varied in accordance with the position of the provisional class tap within a frame, from the input image signal, as a true class tap; class determining means for determining the class of the target pixel from a plurality of classes on the basis of the true class tap; prediction tap selecting means for selecting a plurality of pixels from the input image signal as a prediction tap; and operation means for carrying out arithmetic processing based on conversion data obtained in advance by learning for each of the classes and the prediction tap, thus outputting an output image signal of higher quality than the input image signal.

An image processing method according to the present invention comprises: a provisional class tap selecting step of selecting a plurality of pixels from an input image signal as a provisional class tap, for each target pixel of the input image signal consisting of a plurality of pixels; a true class tap selecting step of selecting a plurality of pixels having their positional relations with the target pixel varied in accordance with the position of the provisional class tap within a frame, from the input image signal, as a true class tap; a class determining step of determining the class of the target pixel from a plurality of classes on the basis of the true class tap; a prediction tap selecting step of selecting a plurality of pixels from the input image signal as a prediction tap; and an operation step of carrying out arithmetic processing based on conversion data obtained in advance by learning for each of the classes and the prediction tap, thus outputting an output image signal of higher quality than the input image signal.

A recording medium according to the present invention has recorded thereon a program for causing a computer to execute image processing, the program comprising: a provisional class tap selecting step of selecting a plurality of pixels from an input image signal as a provisional class tap, for each target pixel of the input image signal consisting of a plurality of pixels; a true class tap selecting step of selecting a plurality of pixels having their positional relations with the target pixel varied in accordance with the position of the provisional class tap within a frame, from the input image signal, as a true class tap; a class determining step of determining the class of the target pixel from a plurality of classes on the basis of the true class tap; a prediction tap selecting step of selecting a plurality of pixels from the input image signal as a prediction tap; and an operation step of carrying out arithmetic processing based on conversion data obtained in advance by learning for each of the classes and the prediction tap, thus outputting an output image signal of higher quality than the input image signal.

An image processing device according to the present invention comprises: class tap selecting means for selecting a plurality of pixels from an input image signal as a class tap, for each target pixel of the input image signal consisting of a plurality of pixels; class determining means for determining the class of the target pixel from a plurality of classes on the basis of the class tap; provisional prediction tap selecting means for selecting a plurality of pixels for said each target pixel from the input image signal as a provisional prediction tap; true prediction tap selecting means for selecting a plurality of pixels having their positional relations with the target pixel varied in accordance with the position of the provisional prediction tap within a frame, from the input image signal as a true prediction tap; and operation means for carrying out arithmetic processing based on conversion data obtained in advance by learning for each of the classes and the true prediction tap, thus outputting an output image signal of higher quality than the input image signal.

An image processing method according to the present invention comprises: a class tap selecting step selecting a plurality of pixels from an input image signal as a class tap, for each target pixel of the input image signal consisting of a plurality of pixels; a class determining step of determining the class of the target pixel from a plurality of classes on the basis of the class tap; a provisional prediction tap selecting step of selecting a plurality of pixels for said each target pixel from the input image signal as a provisional prediction tap; a true prediction tap selecting step of selecting a plurality of pixels having their positional relations with the target pixel varied in accordance with the position of the provisional prediction tap within a frame, from the input image signal as a true prediction tap; and an operation step of carrying out arithmetic processing based on conversion data obtained in advance by learning for each of the classes and the true prediction tap, thus outputting an output image signal of higher quality than the input image signal.

A recording medium according to the present invention has recorded thereon a program for causing a computer to execute image processing, the program comprising: a class tap selecting step selecting a plurality of pixels from an input image signal as a class tap, for each target pixel of the input image signal consisting of a plurality of pixels; a class determining step of determining the class of the target pixel from a plurality of classes on the basis of the class tap; a provisional prediction tap selecting step of selecting a plurality of pixels for said each target pixel from the input image signal as a provisional prediction tap; a true prediction tap selecting step of selecting a plurality of pixels having their positional relations with the target pixel varied in accordance with the position of the provisional prediction tap within a frame, from the input image signal as a true prediction tap; and an operation step of carrying out arithmetic processing based on conversion data obtained in advance by learning for each of the classes and the true prediction tap, thus outputting an output image signal of higher quality than the input image signal.

BRIEF DESCRIPTION OF THE DRAWINGS

FIGS. 12A and 12B show taps used for calculation of time activity.

FIG. 13 shows a tap used for calculation of space activity.

FIG. 24 illustrates chromatic aberration.

FIGS. 25A and 25B illustrate chromatic aberration.

FIGS. 26A to 26C illustrate switching of a tap.

BEST MODE FOR CARRYING OUT THE INVENTION

Preferred embodiments of the present invention will now be described in detail with reference to the drawings.

Figure 1:
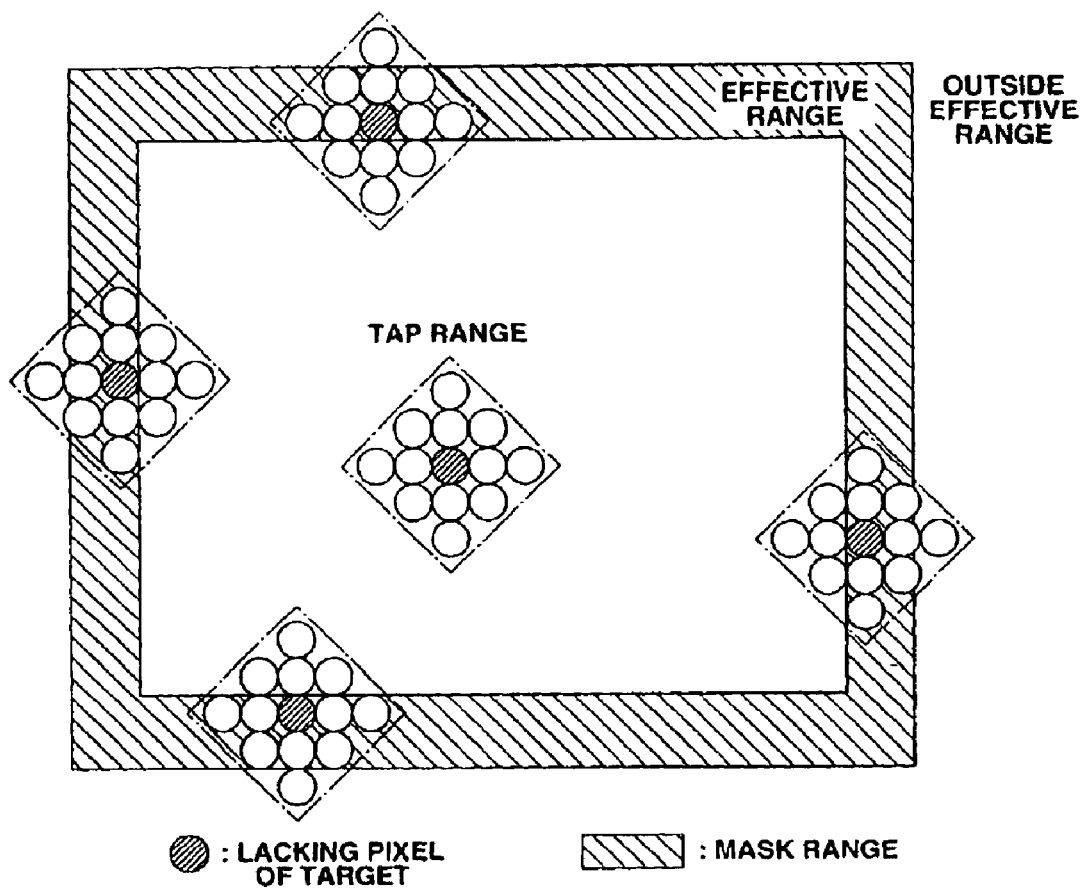
FIG. 1 illustrates a mask of pixels.
Figure 2:
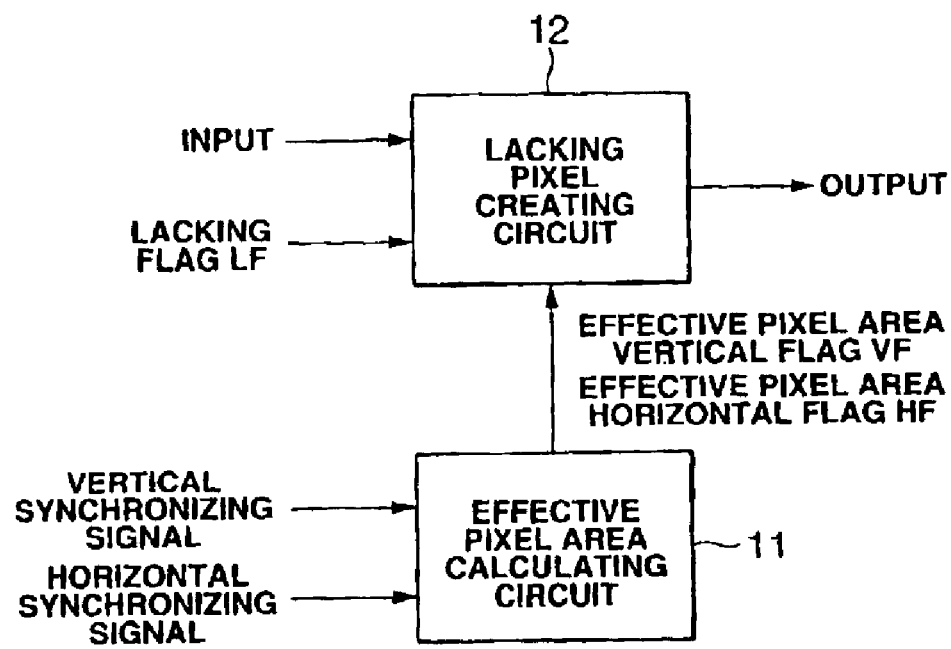
FIG. 2 shows the structure of an embodiment of an image processing device according to the present invention.

FIG. 2 shows the structure of an embodiment of an image processing device according to the present invention. An effective pixel area calculating circuit 11 generates an effective pixel area vertical flag VF and an effective pixel area horizontal flag HF indicating whether pixels of an image inputted to a lacking pixel creating circuit 12 are situated within an effective pixel area or not, on the basis of a vertical synchronizing signal and a horizontal synchronizing signal synchronized with the image inputted to the lacking pixel creating circuit 12, and outputs the effective pixel area vertical flag VF and the effective pixel area horizontal flag HF to the lacking pixel creating circuit 12. In the following description, the pixels are also referred to as taps, and the pixel values are also referred to as tap data.

The lacking pixel creating circuit 12 creates a pixel corresponding to a lacking pixel included in the inputted image on the basis of a lacking flag LF corresponding to the inputted image and each pixel of the image, and the effective pixel area vertical flag VF and the effective pixel area horizontal flag HF supplied from the effective pixel area calculating circuit 11. The lacking pixel creating circuit 12 substitutes the created pixel for the lacking pixel and thus outputs the created pixel.

Figure 3:
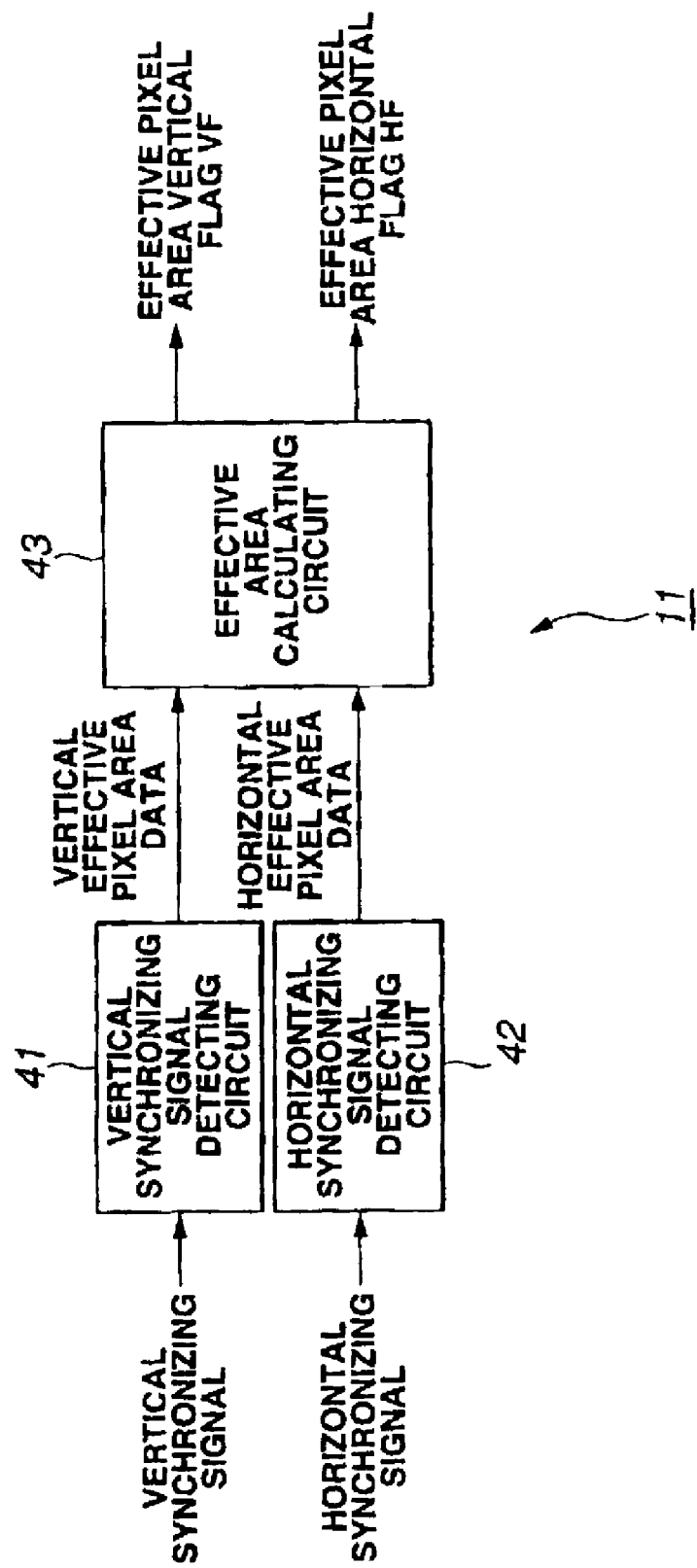
FIG. 3 shows an exemplary structure of an effective pixel area calculating circuit.

FIG. 3 shows an exemplary structure of the effective pixel area calculating circuit 11. A vertical synchronizing signal detecting circuit 41 generates data indicating whether or not each pixel of the image is within the effective pixel area in the vertical direction of the screen (hereinafter referred to as vertical effective pixel area data) on the basis of the inputted vertical synchronizing signal, and supplies the data to an effective area calculating circuit 43. A horizontal synchronizing signal detecting circuit 42 generates data indicating whether or not each pixel of the image is within the effective pixel area in the horizontal direction of the screen (hereinafter referred to as horizontal effective pixel area data) on the basis of the inputted horizontal synchronizing signal, and supplies the data to the effective area calculating circuit 43.

The effective area calculating circuit 43 corrects the vertical effective pixel area data supplied from the vertical synchronizing signal detecting circuit 41 and outputs the corrected data as an effective pixel area vertical flag VF to the lacking pixel creating circuit 12.

Figure 4:
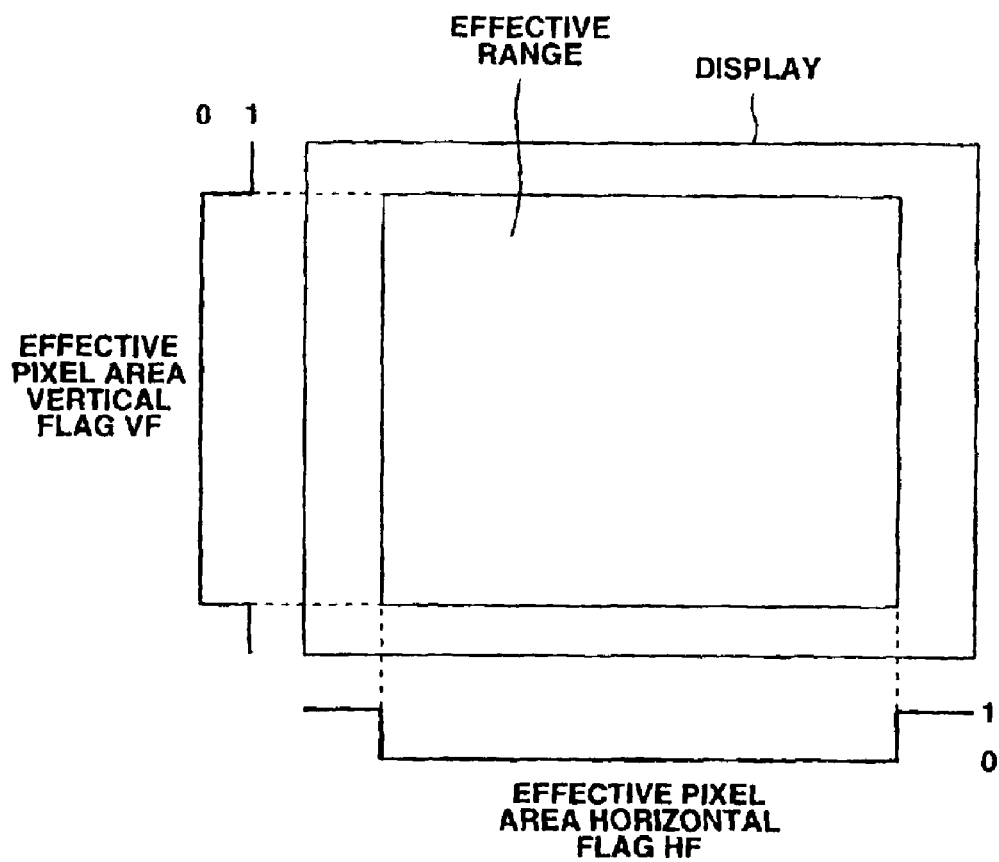
FIG. 4 illustrates an effective pixel area vertical flag VF and an effective pixel area horizontal flag HF.

For the effective pixel area vertical flag VF, a value 0 is set within the effective range of the display and a value 1 is set outside the effective range of the display, for example, as shown in FIG. 4.

The effective area calculating circuit 43 corrects the horizontal effective pixel area data supplied from the horizontal synchronizing signal detecting circuit 42 and outputs the corrected data as an effective pixel area horizontal flag HF to the lacking pixel creating circuit 12.

For the effective pixel area horizontal flag HF, a value 0 is set within the effective range of the display and a value 1 is set outside the effective range of the display, for example, as shown in FIG. 4.

The lacking pixel creating circuit 12 can learn whether each pixel of the inputted image is situated within the effective pixel area or not, on the basis of the effective pixel area vertical flag VF and the effective pixel area horizontal flag HF supplied from the effective pixel area calculating circuit 11.

The lacking pixel creating circuit 12 will now be described. When the imaged inputted to the lacking pixel creating circuit 12 is an interlaced image, the position of a pixel of a target field is vertically shifted by ½ from the position of a pixel of the field immediately before or immediately after the target field.

Figure 5:
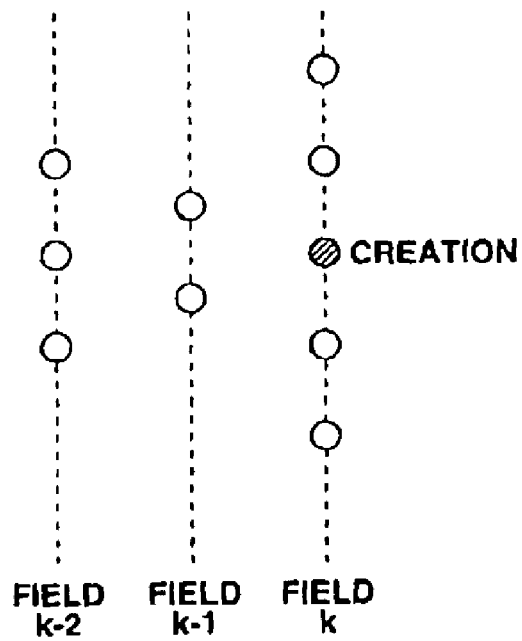
FIG. 5 illustrates pixels around a target of creation.

The lacking pixel creating circuit 12 creates a pixel value of the lacking pixel on the basis of the pixel values of surrounding pixels in the same field (field k in FIG. 5) as the target pixel of creation, the pixel values of pixels existing in the field immediately before (field k−1 in FIG. 5), and the pixel values of pixels existing in the field that is two fields before (field k−2 in FIG. 5), as shown in FIG. 5, by classification adaptive processing.

Figure 6:
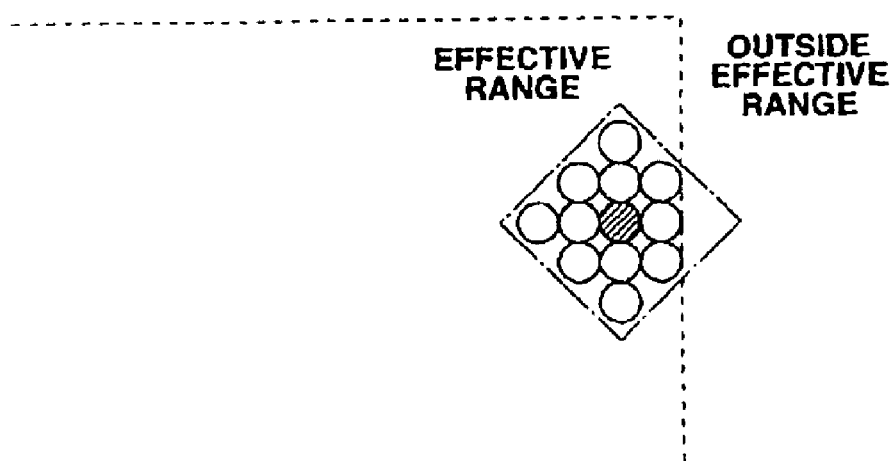
FIG. 6 shows an exemplary construction of a tap at an edge of an image.

When the lacking pixel as a target of creation is situated at an edge of the image, lacking pixel creating circuit 12 selects only the pixels situated within the effective range of the image (that is, discards the pixels situated outside the effective range of the image) on the basis of the effective pixel area vertical flag VF and the effective pixel area horizontal flag HF supplied from the effective pixel area calculating circuit 11, as shown in FIG. 6, and thus creates the pixel value of the lacking pixel on the basis of the selected pixels.

Figure 7:
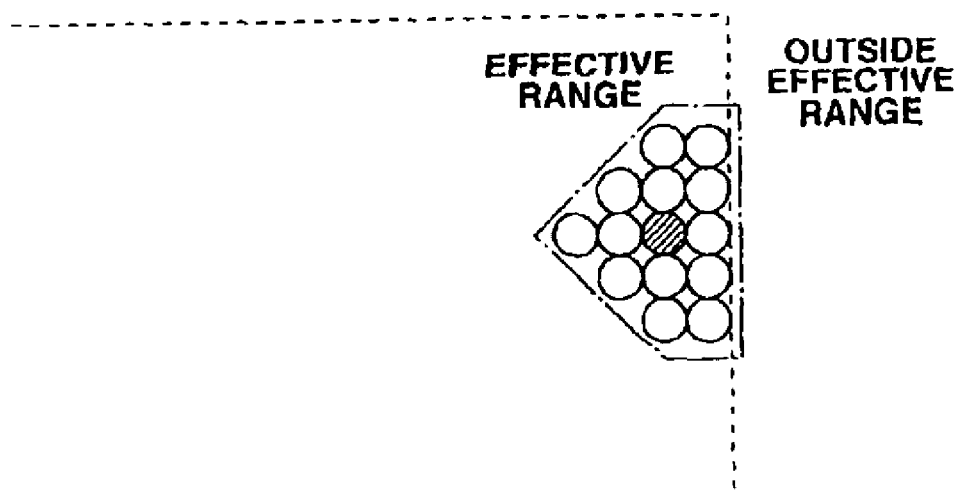
FIG. 7 shows an exemplary construction of a tap at an edge of an image.

When the lacking pixel as a target of creation is situated at an edge of the image, the lacking pixel creating circuit 12 may also select effective pixels as taps by adaptively switching to a tap structure in which the pixels situated within the effective range of the image are adopted, on the basis of the effective pixel area vertical flag VF and the effective pixel area horizontal flag HF supplied from the effective pixel area calculating circuit 11, as shown in FIG. 7, and thus may create the pixel value of the lacking pixel.

Figure 8:
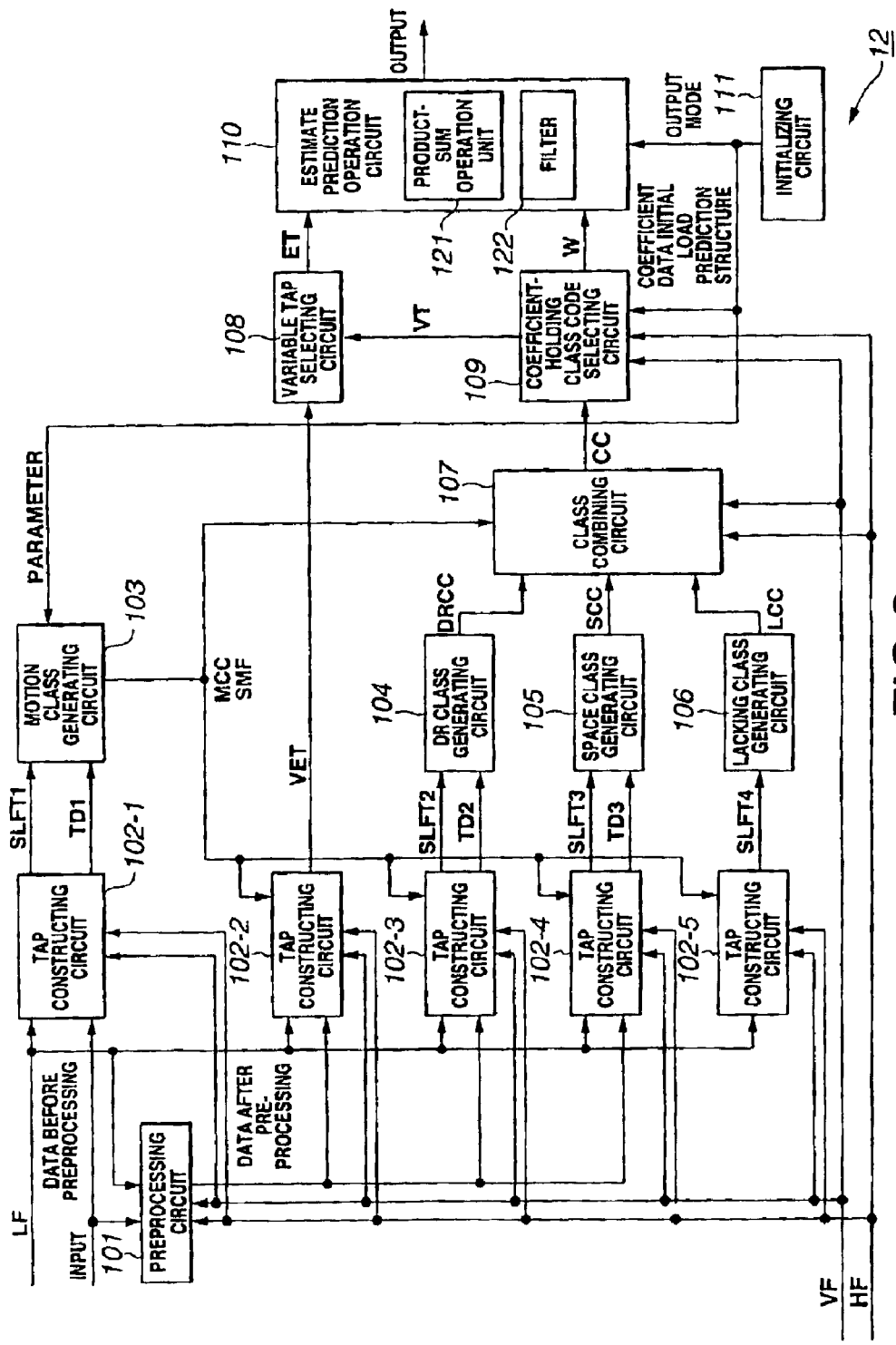
FIG. 8 is a block diagram showing the structure of a lacking pixel creating circuit.

FIG. 8 is a block diagram showing an exemplary structure of the lacking pixel creating circuit 12. The pixel value and the lacking flag LF indicating the lack of the pixel, inputted to the lacking pixel creating circuit 12, are supplied to a preprocessing circuit 101 and a tap constructing circuit 102-1.

The effective pixel area vertical flag VF and the effective pixel area horizontal flag HF inputted from the effective pixel area calculating circuit 11 are supplied to the preprocessing circuit 101, the tap constructing circuits 102-1 to 102-5, a class combining circuit 107, and a coefficient-holding class code selecting circuit 109.

The preprocessing circuit 101 sets the lacking flag LF of the pixel situated outside the effective pixel area on the basis of the effective pixel area vertical flag VF and the effective pixel area horizontal flag HF. For example, a lacking flag LF of "1" indicates that the pixel value is lacking, and a lacking flag LF of "0" indicates that the pixel value is not lacking. The preprocessing Circuit 101 generates the value of the lacking pixel within the effective pixel area on the basis of the lacking flag LF corresponding to the pixel value and the pixel, by using a linear interpolation filter, and sets the generated value for the lacking pixel. The preprocessing circuit 101 then supplies the set value to the tap constructing circuits 102-1 to 102-5. That is, when a pixel or pixels arc lacking, the preprocessing circuit 101 increase the number of prediction taps by the number of lacking pixels.

However, the class tap includes no lacking pixels and the classification processing uses no pixel values that are generated by the preprocessing circuit 101, as will be described later.

Figure 9:
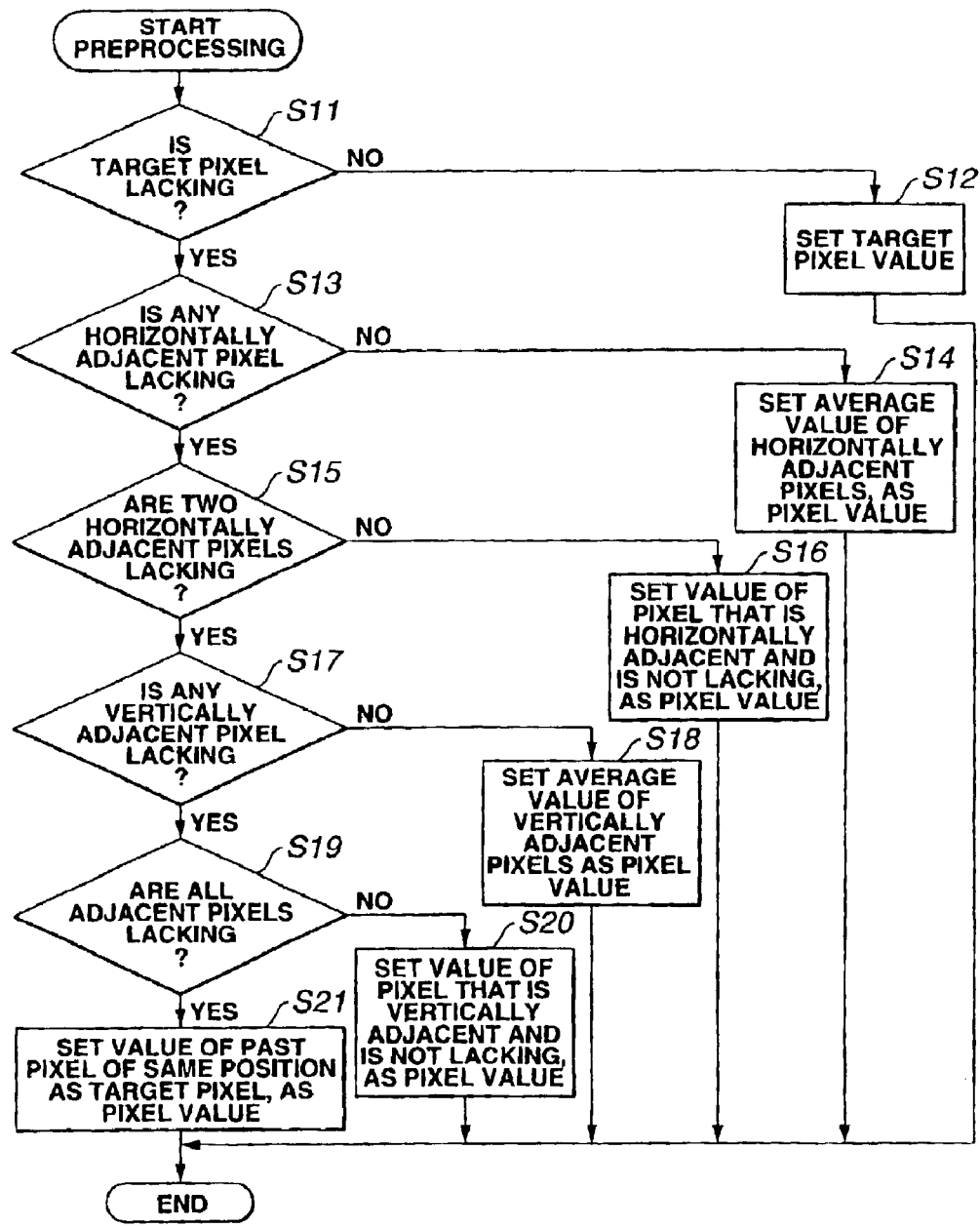
FIG. 9 is a flowchart for explaining the processing at a preprocessing circuit.

The processing at the preprocessing circuit 101 will now be described with reference to the flowchart of FIG. 9. At step S11, the preprocessing circuit 101 discriminates whether a target pixel is lacking or not on the basis of the lacking flag LF. If it is determined that the target pixel is not lacking, the processing goes to step S12, where the pixel value of the target pixel is set for the target pixel and then the processing ends.

If it is determined at step S11 that the target pixel is lacking, the processing goes to step S13 and the preprocessing circuit 101 discriminates whether one of the two pixels adjacent to the target pixel in the horizontal direction is lacking or not on the basis of the lacking flag LF. If it is determined at step S13 that neither of the two pixels adjacent to the target pixel in the horizontal direction is lacking, the processing goes to step S14 and the preprocessing circuit 101 sets the average value of the pixel values of the two pixels adjacent to the target pixel in the horizontal direction, as the pixel value of the target pixel. Then, the processing ends.

If it is determined at step S13 that one of the two pixels adjacent to the target pixel in the horizontal direction is lacking, the processing goes to step S15 and the preprocessing circuit 101 discriminates whether both of the two pixels adjacent to the target pixel in the horizontal direction are lacking or not. If it is determined at step S15 that one of the two pixels adjacent to the target pixel in the horizontal direction is not lacking, the processing goes to step S16 and the preprocessing circuit 101 sets the pixel value of the pixel that is horizontally adjacent to the target pixel and that is not lacking, as the pixel value of the target pixel. Then, the processing ends.

If it is determined at step S15 that both of the two pixels horizontally adjacent to the target pixel are lacking, the processing goes to step S17 and the preprocessing circuit 101 discriminates whether one of the two pixels adjacent to the target pixel in the vertical direction is lacking or not on the basis of the lacking flag LF. If it is determined at step ST17 that neither one of the two pixels adjacent to the target pixel in the vertical direction is lacking, the processing goes to step S18 and the preprocessing circuit 101 sets the average value of the pixel values of the two pixels vertically adjacent to the target pixel, as the pixel value of the target pixel. Then, the processing ends.

If it is determined at step S17 that one of the two pixels adjacent to the target pixel in the vertical direction is lacking, the processing goes to step S19 and the preprocessing circuit 101 discriminates whether all the pixels adjacent to the target pixel are lacking or not on the basis of the lacking flag LF. If it is determined at step S19 that one of the pixels adjacent to the target pixel is not lacking, the processing goes to step S20 and the preprocessing circuit 101 sets the pixel value of the pixel that is adjacent to the target pixel and that is not lacking, as the pixel value of the target pixel. Then, the processing ends.

If it is determined at step S19 that all the pixels adjacent to the target pixel are lacking, the processing goes to step S21 and the preprocessing circuit 101 sets the pixel value of the pixel in the past frame which is of the same position as the target pixel, as the pixel value of the target pixel. Then, the processing ends.

As described above, the preprocessing circuit 101 linearly interpolates the pixel value of the target pixel in the processing within the effective pixel area, from the pixel values of the surrounding pixels. The interpolation processing by the preprocessing circuit 101 enables expansion of the range of taps that can be used in the subsequent processing.

The tap constructing circuit 102-1 sets the lacking flag LF of the pixel situated outside the effective pixel area on the basis of the effective pixel area vertical flag VF and the effective pixel area horizontal flag HF, then resets the lacking flag LF of the pixel situated outside the effective pixel area, and supplies the lacking flag LF as a lacking flag tap SLFT1 to a motion class generating circuit 103. The tap constructing circuit 102-1 selects a motion class tap TD1 consisting of the pixels within the effective pixel area that are not lacking, and supplies the selected motion class tap TD1 to the motion class generating circuit 103.

The motion class generating circuit 103 generates a motion class code MCC and a static/motion flag SMF on the basis of a parameter supplied from an initializing circuit 111 and the lacking flag tap SLFT1 and the selected motion class tap TD1 supplied from the tap constructing circuit 102-1, and outputs the motion class code MCC and the static/motion flag SMF to the tap constructing circuits 102-2 to 102-5 and a class combining circuit 107. The motion class code MCC is 2-bit information indicating the quantity of motion, and the static/motion flag SMF is 1-bit information indicating the presence/absence of motion.

Figure 10:
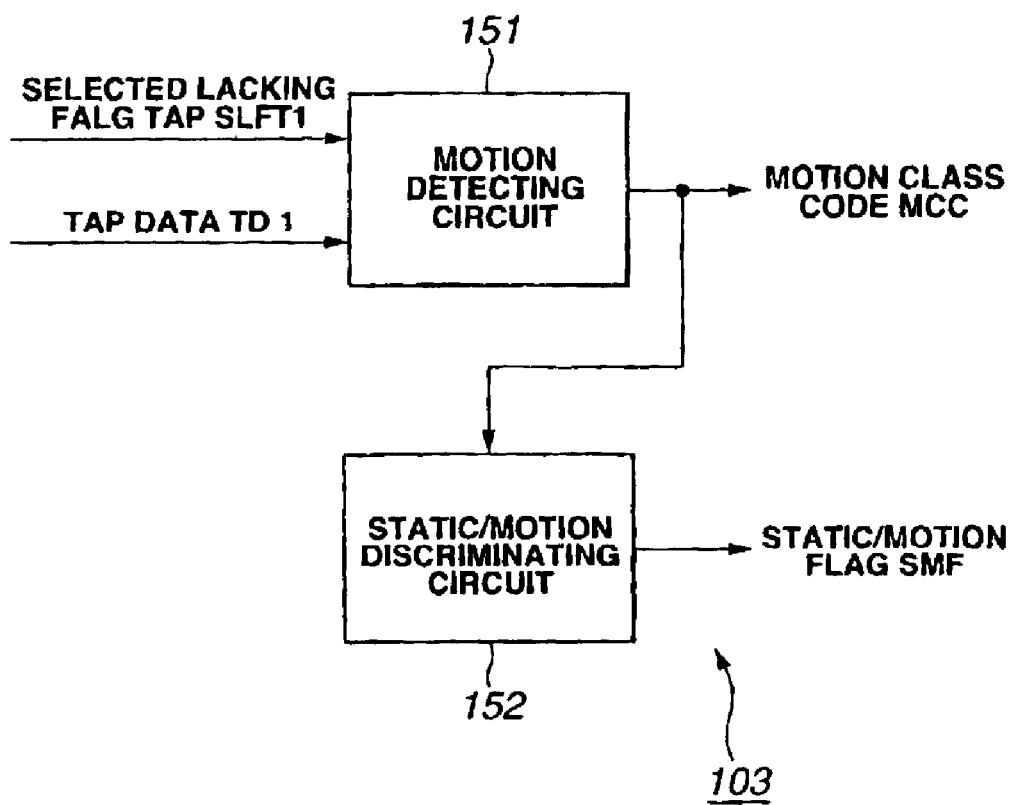
FIG. 10 shows the structure of a motion class generating circuit.

FIG. 10 shows the structure of the motion class generating circuit 103. The lacking flag tap SLFT1 and the motion class tap. TD1 supplied from the tap constructing circuit 102-1 are supplied to a motion detecting circuit 151. The motion detecting circuit 151 generates a motion class code MCC on the basis of the lacking flag tap SLFT1 and the motion class tap TD1 and outputs the motion class code MCC. The motion detecting circuit 151 also supplies the generated motion class code MCC to a static/motion discriminating circuit 152.

Figure 11:
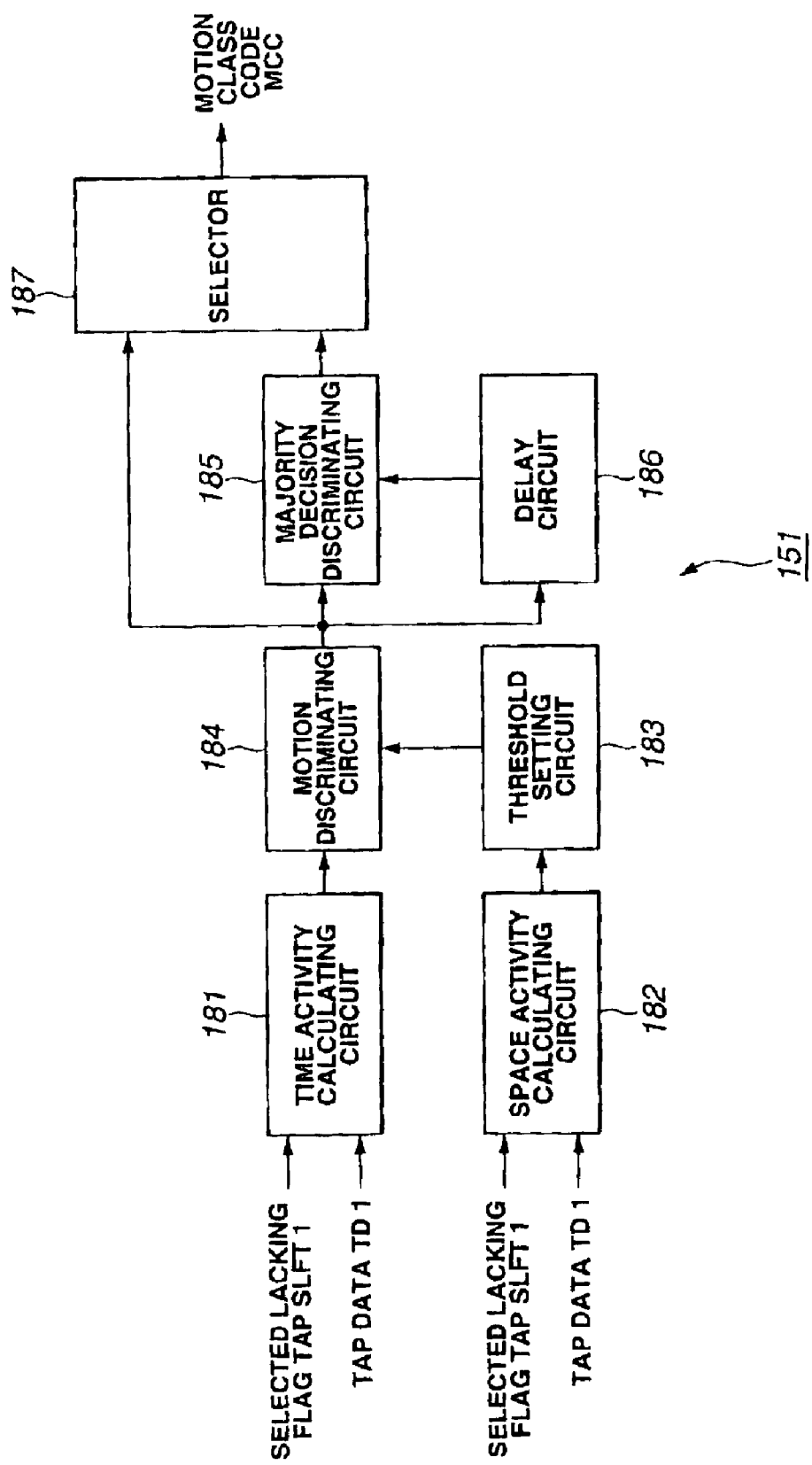
FIG. 11 shows the structure of a motion detecting circuit.

The structure of the motion detecting circuit 151 will now be described with reference to the block diagram of FIG. 11. A time activity calculating circuit 181 calculates the time activity by adding absolute values of differences in the pixel values, for example, between 3×3 pixels (included in the motion class tap TD1) that are within the effective area, are not lacking and are around the target pixel of creation, and corresponding 3×3 pixels (included in the motion class tap TD1) that are within the effective area and are not lacking, of the frame immediately before, on the basis of the lacking flag tap SLFT1 and the motion class tap TD1 supplied from the tap constructing circuit 102-1. The time activity calculating circuit 181 then supplies the time activity to a motion discriminating circuit 184. The time activity calculating circuit 181 calculates the time activity by using only the pixels that are not lacking, without using the lacking pixels.

FIG. 12A shows an example of 3×3 pixels around the target pixel of creation, used for calculating the time activity. In FIG. 12A, "ERROR" indicates a lacking pixel. FIG. 12B shows an example of 3×3 pixels of the frame immediately before, corresponding to the pixels shown in FIG. 12A. L1 to L3 in FIGS. 12A and 12B represent the respective lines, and the same line number indicates the same position in the vertical direction. H1 to H3 in FIGS. 12A and 12B represent the horizontal positions of the respective pixels, and the same number indicates the same position in the horizontal direction.

Since the lacking pixels are not used, the time activity in the case of FIGS. 12A and 12B is calculated by the following equation (1).

$$\text{Time activity} = \{|(q2)-(p2)|+|(q3)-(p3)|+|(q4)-(p4)|+|(q6)-(p6)|+|(q7)-(p7)|+|(q9)-(p9)|\}/v \quad (1)$$

In the equation (1), ( ) represents the pixel value of a pixel, || represents the function for finding an absolute value, and v represents the number obtained by subtracting the number of lacking pixels from the number of pixels of a frame in which the target pixel of creation exists.

A space activity calculating circuit 182 calculates the space activity, for example, by adding 1 to the difference between the maximum value and the minimum value of 3×3 pixels around the target pixel of creation, on the basis of the lacking flag tap SLFT1 and the motion class tap TD1 supplied from the tap constructing circuit 102-1, and supplies the space activity to a threshold setting circuit 183.

FIG. 13 shows an example of 3×3 pixels around the lacking pixel as a target of creation, used for calculating the space activity. The space activity is calculated by the following equation (2).

$$\text{Space activity} = \text{Max}(qi) - \text{Min}(qi) + 1 \qquad (2)$$

In the equation (2), Max(qi) represents the maximum value of the pixel values q1 to q9, and Min(qi) represents the minimum value of the pixel values q1 to q9.

The threshold setting circuit 183 selects a threshold value for motion discrimination, stored in advance in the threshold setting circuit 183, on the basis of the space activity supplied from the space activity calculating circuit 182, and supplies the selected threshold value to the motion discriminating circuit 184. As the threshold value for motion discrimination supplied to the motion discriminating circuit 184, various threshold values are selected depending on the value of the space activity.

The motion discriminating circuit 184 sets a motion class code MCC on the basis of the threshold value for motion discrimination supplied from the threshold setting circuit 183 and the time activity supplied from the time activity calculating circuit 181, and supplies the motion class code MCC to a majority decision discriminating circuit 185, a delay circuit 186 and a selector 187.

Figure 14:
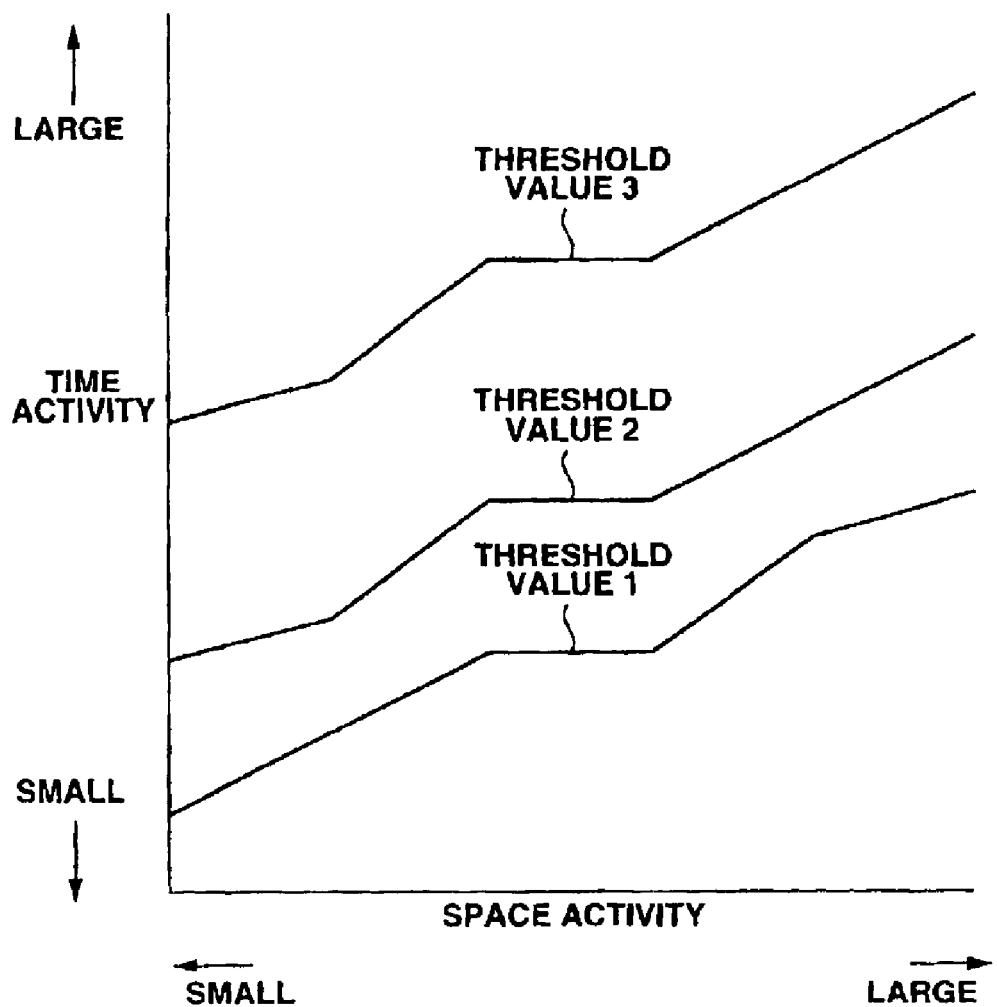
FIG. 14 illustrates threshold values for motion discrimination.

FIG. 14 shows threshold values for motion discrimination. As the threshold value for motion discrimination, various threshold values are used depending on the space activity. When the space activity becomes large, a large threshold value is used. This is because when a pixel with large space activity makes little motion, the time activity has a large value.

Figure 15:
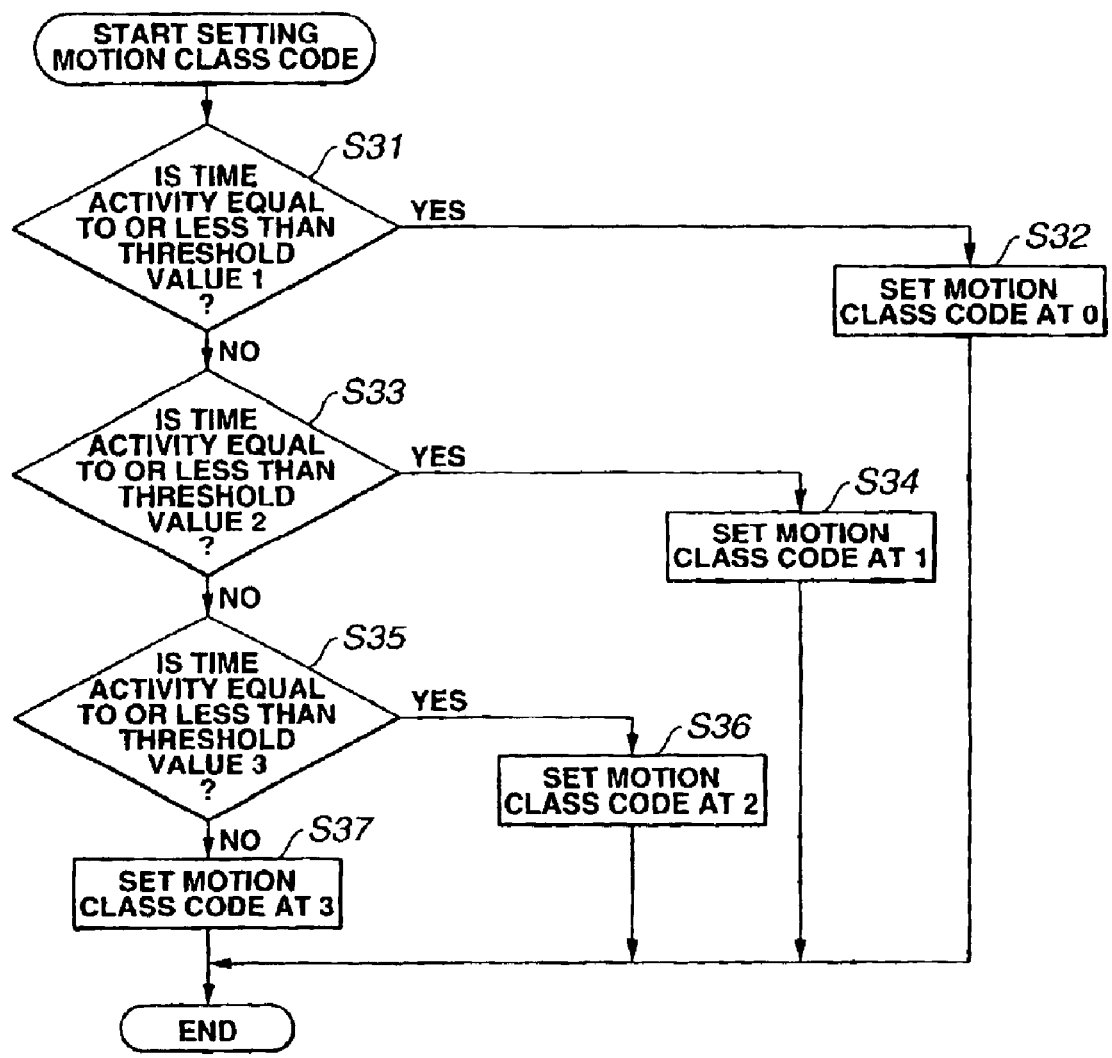
FIG. 15 is a flowchart for explaining the processing for setting a motion class code MCC of the motion discriminating circuit.

The processing for setting the motion class code MCC by the motion discriminating circuit 184 will now be described with reference to the flowchart of FIG. 15. At step S31, the motion discriminating circuit 184 discriminates whether or not the time activity is equal to or less than a threshold value 1. If it is determined that the time activity is equal to or less than the threshold value 1, the processing goes to step S32 and the motion discriminating circuit 184 sets the motion class code MCC at 0. Then, the processing ends.

If it is determined at step S31 that the time activity exceeds the threshold value 1, the processing goes to step S33 and the motion discriminating circuit 184 discriminates whether or not the time activity is equal to or less than a threshold value 2. If it is determined that the time activity is equal to or less than the threshold value 2, the processing goes to step S34 and the motion discriminating circuit 184 sets the motion class code MCC at 1. Then, the processing ends.

If it is determined at step S33 that the time activity exceeds the threshold value 2, the processing goes to step S35 and the motion discriminating circuit 184 discriminates whether or not the time activity is equal to or less than a threshold value 3. If it is determined that the time activity is equal to or less than the threshold value 3, the processing goes to step S36 and the motion discriminating circuit 184 sets the motion class code MCC at 2. Then, the processing ends.

If it is determined at step S35 that the time activity exceeds the threshold value 3, the processing goes to step S37 and the motion discriminating circuit 184 sets the motion class code MCC at 3. Then, the processing ends.

As described above, the motion discriminating circuit 184 sets the motion class code MCC on the basis of the threshold value and the time activity.

Figure 16:
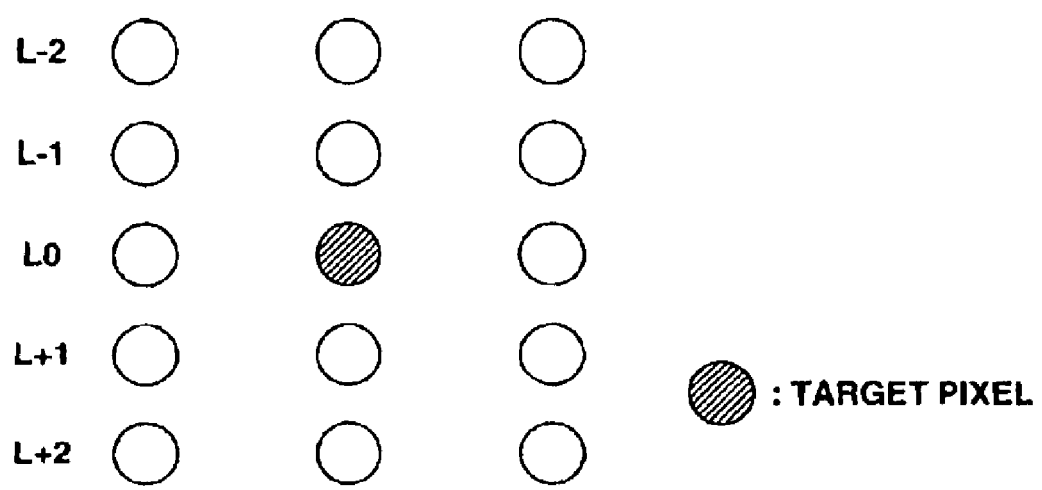
FIG. 16 illustrates pixels used for discrimination by majority decision of the motion class code MCC.

The majority decision discriminating circuit 185 sets the ultimate motion class code MCC on the basis of the motion class codes MCC of a plurality of pixels. For example, as shown in FIG. 16, the majority decision discriminating circuit 185 sets the motion class code MCC of the target pixel on the basis of the motion class codes MCC of 14 pixels around the target pixel of creation.

Figure 17:
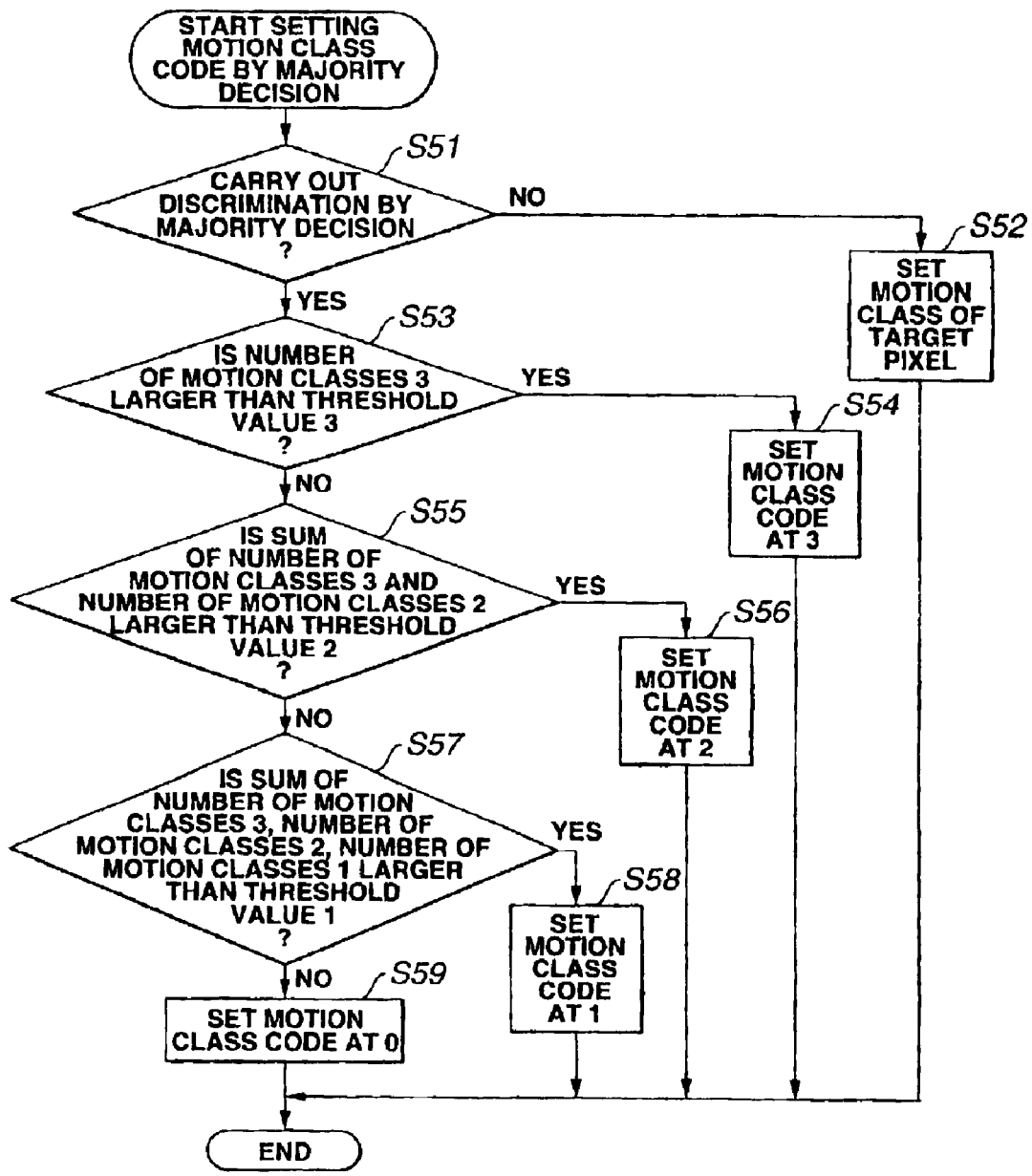
FIG. 17 is a flowchart for explaining the processing for setting the motion class code MCC of the motion detecting circuit.
Figure 18:
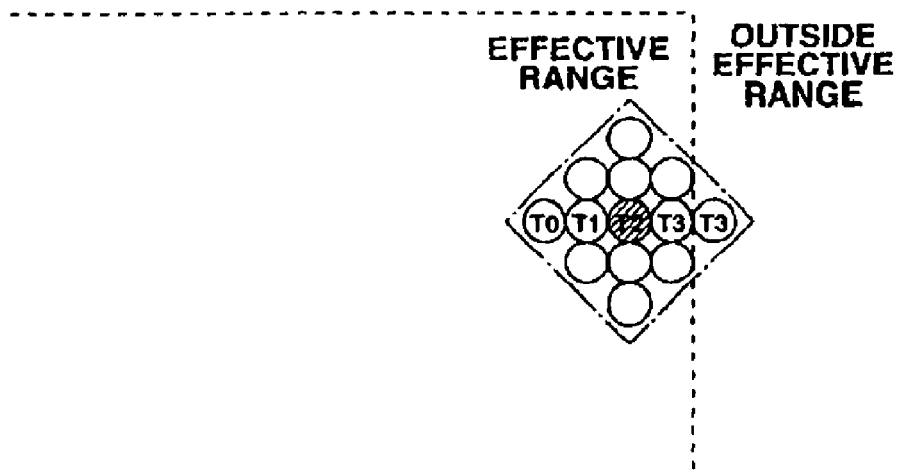
FIG. 18 shows an exemplary construction of a tap at an edge of an image.
Figure 19:
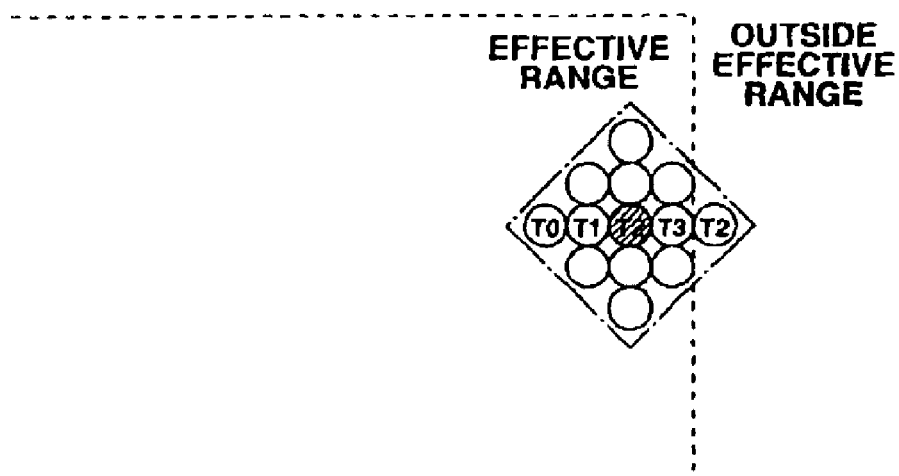
FIG. 19 shows an exemplary construction of a tap at an edge of an image.

The processing for setting the motion class code MCC by the motion detecting circuit 151 will now be described with reference to the flowchart of FIG. 17. At step S51, the motion detecting circuit 151 discriminates whether discrimination by majority decision will be carried out or not, in accordance with the setting of the parameter from the initializing circuit 111. If it is determined that discrimination by majority decision will not be carried out, the processing goes to step S52. The selector 187 selects the motion class code MCC of the target pixel outputted from the motion discriminating circuit 184 and sets the motion class code MCC of the target pixel as the ultimate motion class code MCC. Then, the processing ends.

If it is determined at step S51 that discrimination by majority decision will be carried out, the processing goes to step S53 and the majority decision discriminating circuit 185 discriminates whether or not the number of pixels for which a motion class code MCC of 3 is set, of the 14 pixels, is larger than the threshold value 3. If it is determined that the number of pixels for which the motion class code MCC of 3 is set is larger than the threshold value 3, the processing goes to step S54 and the majority decision discriminating circuit 185 sets the motion class code MCC at 3. The selector 187 outputs the output of the majority decision discriminating circuit 185 as the ultimate motion class code MCC, and then the processing ends.

If it is determined at step S53 that the number of pixels for which the motion class code MCC of 3 is set is equal to or less than the threshold value 3, the processing goes to step S55 and the majority decision discriminating circuit 185 discriminates whether or not the value of the sum of the number of pixels for which the motion class code MCC of 3 is set and the number of pixels for which the motion class code MCC of 2 is set, of the 14 pixels, is larger than the threshold value 2. If it is determined that the value of the sum of the number of pixels for which the motion class code MCC of 3 is set and the number of pixels for which the motion class code MCC of 2 is set is larger than the threshold value 2, the processing goes to step S56 and the majority decision discriminating circuit 185 sets the motion class code MCC at 2. The selector 187 outputs the output of the majority decision discriminating circuit 185 as the ultimate motion class code MCC, and then the processing ends.

If it is determined at step S55 that the value of the sum of the number of pixels for which the motion class code MCC of 3 is set and the number of pixels for which the motion class code MCC of 2 is set is equal to or less than the threshold value 2, the processing goes to step S57 and the majority decision discriminating circuit 185 discriminates whether or not the value of the sum of the number of pixels for which the motion class code MCC of 3 is set, the number of pixels for which the motion class code MCC of 2 is set and the number of pixels for which the motion class code MCC of 1 is set, of the 14 pixels, is larger than the threshold value 1. If it is determined that the value of the sum of the number of pixels for which the motion class code MCC of 3 is set, the number of pixels for which the motion class code MCC of 2 is set and the number of pixels for which the motion class code MCC of 1 is set is larger than the threshold value 1, the processing goes to step S58 and the majority decision discriminating circuit 185 sets the motion class code MCC at 1. The selector 187 outputs the output of the majority decision discriminating circuit 185 as the ultimate motion class code MCC, and then the processing ends.

If it is determined at step S57 that the value of the sum of the number of pixels for which the motion class code MCC of 3 is set, the number of pixels for which the motion class code MCC of 2 is set and the number of pixels for which the motion class code MCC of 1 is set is equal to or less than the threshold value 1, the processing goes to step S59 and the majority decision discriminating circuit 185 sets the motion class code MCC at 0. The selector 187 outputs the output of the majority decision discriminating circuit 185 as the ultimate motion class code MCC, and then the processing ends.

In this manner, the motion detecting circuit 151 sets the ultimate motion class code MCC on the basis of the motion class codes MCC of a plurality of pixels and the threshold values stored in advance.

As described above, the motion class generating circuit 103 sets the motion class code MCC from the pixel values of a plurality of pixels and outputs the motion class code MCC to the static/motion discriminating circuit 152 and the lacking pixel creating circuit 12.

Referring again to FIG. 10, the static/motion discriminating circuit 152 sets the static/motion flag SMF on the basis of the motion class code MCC and outputs the static/motion flag SMF. For example, when the motion class code MCC is 0 or 1, the static/motion flag SMF is set at 0. When the motion class code MCC is 2 or 3, the static/motion flag SMF is set at 1.

The tap constructing circuit 102-2 selects an all-class prediction tap VET (not including the pixels outside the effective pixel area) covering all the class structures, on the basis of the motion class code MCC and the static/motion flag SMF supplied from the motion class generating circuit 103 and the lacking flag LF. The tap constructing circuit 102-2 then supplies the all-class prediction tap VET to a variable tap selecting circuit 108.

The tap constructing circuit 102-3 sets the lacking flag LF of the pixels situated outside the effective pixel area on the basis of the effective pixel area vertical flag VF and the effective pixel area horizontal flag HF, then resets the lacking flag LF of the pixels situated outside the effective pixel area, and supplies the lacking flag LF as a lacking flag tap SLFT2 to a DR class generating circuit 104. The tap constructing circuit 102-3 selects a DR class tap TD2 that is within the effective pixel area and is not lacking, on the basis of the motion class code MCC and the static/motion flag SMF supplied from the motion class generating circuit 103 and the lacking flag LF, and supplies the selected DR class tap TD2 to the DR class generating circuit 104. The DR class generating circuit 104 generates a DR class code DRCC decided in accordance with a dynamic range, that is, the difference between the maximum pixel value and the minimum pixel value of the pixels that are included in the DR class tap TD2 and are not lacking, on the basis of the lacking flag tap SLFT2 and the DR class tap TD2 supplied from the tap constructing circuit 102-3. The DR class generating circuit 104 then outputs the DR class code DRCC to the class combining circuit 107. The tap constructing circuit 102-4 sets the lacking flag LF of the pixels situated outside the effective pixel area on the basis of the effective pixel area vertical flag VF and the effective pixel area horizontal flag HF supplied from the effective pixel area calculating circuit 11, then resets the lacking flag LF of the pixels situated outside the effective pixel area, and supplies the lacking flag LF as a lacking flag tap SLFT3 to a space class generating circuit 105. The tap constructing circuit 102-4 selects a space class tap TD3 that is within the effective pixel area and is not lacking, on the basis of the motion class code MCC and the static/motion flag SMF supplied from the motion class generating circuit 103 and the lacking flag LF, and supplies the selected space class lap TD3 to the space class generating circuit 105. The space class generating circuit 105 generates a space class code SCC corresponding to the pixel value pattern on the basis of the lacking flag tap SLFT3 and the space lap TD3 supplied from the tap constructing circuit 102-4, and outputs the space class code SCC to the class combining circuit 107.

The tap constructing circuit 102-5 selects a lacking flag LF on the basis of the effective pixel area vertical flag VF and the effective pixel area horizontal flag HF supplied from the effective pixel area calculating circuit 11, and supplies the selected lacking flag LF as a lacking flag tap SLFT4 to a lacking class generating circuit 106. The lacking class generating circuit 106 generates a lacking class code LCC on the basis of the lacking flag tap SLFT4 supplied from the tap constructing circuit 102-5, and outputs the lacking class code LCC to the class combining circuit 107.

The class combining circuit 107 combines the motion class code MCC, the static/motion flag SMF, the DR-class code DRCC, the space class code SCC and the lacking class code LCC on the basis of the effective pixel area vertical flag VF and the effective pixel area horizontal flag HF supplied from the effective pixel area calculating circuit 11, thus forming a single ultimate class code CC. The class combining circuit 107 then outputs the class code CC to the coefficient-holding class code selecting circuit 109.

The coefficient-holding class code selecting circuit 109 generates a prediction tap selecting signal VT on the basis of the effective pixel area vertical flag VF and the effective pixel area horizontal flag HF supplied from the effective pixel area calculating circuit 11, a coefficient set and a prediction structure supplied from the initializing circuit 111 and the class code CC supplied from the class combining circuit 107, and supplies the generated prediction tap selecting signal VT to the variable tap selecting circuit 108. At the same time, the coefficient-holding class code selecting circuit 109 outputs a prediction coefficient W selected from the coefficient set on the basis of the class code CC, to an estimate prediction operation circuit 110. The coefficient set supplied from the initializing circuit 111 is generated in advance, corresponding to the class found as a result of classification by the class code CC, and is stored by the initializing circuit 111.

The variable tap selecting circuit 108 selects a prediction tap ET on the basis of the all-class prediction tap VET supplied from the tap constructing circuit 102-2 and the prediction tap selecting circuit VT supplied from the coefficient-holding class code selecting circuit 109, and supplies the selected prediction tap ET to the estimate prediction operation circuit 110. For example, the variable tap selecting circuit 108 selects a tap designated by the prediction tap selecting signal VT, from the taps included in the all-class prediction tap VET, and designates the selected tap as a prediction tap ET.

A product-sum operation unit 121 of the estimate prediction operation circuit 110 calculates the pixel value of the lacking pixel using a linear estimate formula on the basis of the prediction tap ET supplied from the variable tap selecting circuit 108 and the prediction coefficient W supplied from the coefficient-holding class code selecting circuit 109.

The product-sum operation unit 121 may also calculate the pixel value of the lacking pixel using a nonlinear estimate formula on the basis of the prediction coefficient W.

A filter 122 of the estimate prediction operation circuit 110 calculates the pixel value of the lacking pixel from the prediction tap ET supplied from the variable tap selecting circuit 108.

The estimate prediction operation circuit 110 selects and outputs the output of the filter 122 or the output of the product-sum operation unit 121 on the basis of the output mode set by the initializing circuit 111, thus generating the result corresponding to the output mode.

In this manner, the lacking pixel creating circuit 12 carries out classification in accordance with the dynamic range, motion, lacking and pixel value pattern from the pixels within the effective pixel area, on the basis of the effective pixel area vertical flag VF and the effective pixel area horizontal flag HF, and calculates the lacking pixel value on the basis of the pixel values of the pixels around the lacking pixel (not including the pixel values of the pixels outside the effective pixel area).

The lacking pixel creating circuit 12 can improve the quality of an inputted image (for example, increase in gray scales (increase in the number of bits of Y data, U data and V data), elimination of noise, elimination of quantization distortion (including elimination of distortion in the time direction), creation of a resolution of quadruple density and so on), by switching the output mode of the estimate prediction operation circuit 110 to carry out the above-described processing with respect to all the pixels.

Figure 20:
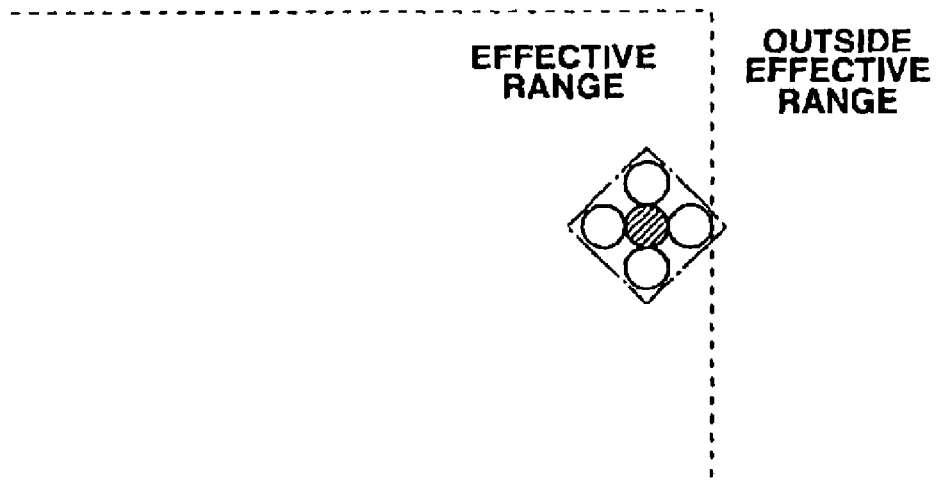
FIG. 20 illustrates pixels used for interpolation processing.

Moreover, if it is determined that the lacking pixel as a target of creation is situated at an edge of the image and that a predetermined number of taps or more are lacking, the lacking pixel creating circuit 12 may carry out linear interpolation processing on the basis of the pixel values of the adjacent pixels, thus interpolating the pixel value of the lacking pixel, as shown in FIG. 20, instead of classification adaptive processing.

Figure 21:
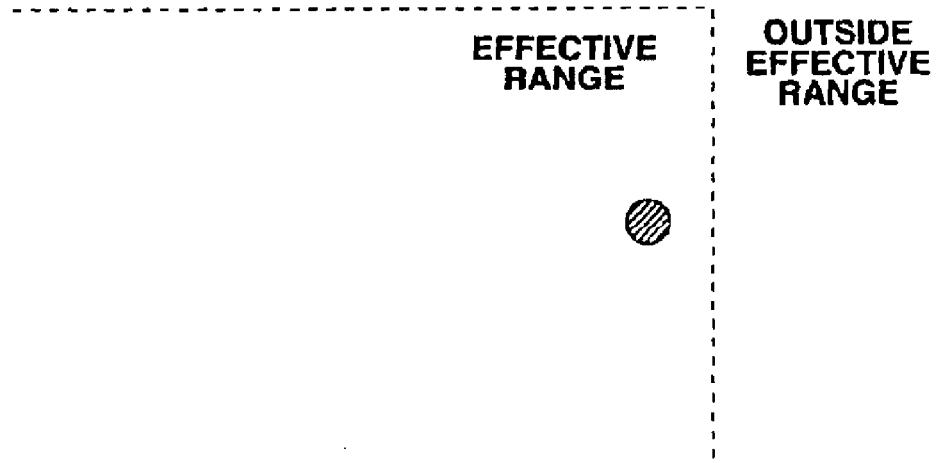
FIG. 21 Illustrates a pixel with its pixel value substituted.

When the lacking pixel as a target of creation is situated at an edge of the image and all the adjacent pixels are lacking, the lacking pixel creating circuit 12 may set a value corresponding to a predetermined dull color (for example, gray) as the pixel value of the lacking pixel, or may set the pixel value of the pixel at the same position in the past frame, as shown in FIG. 21.

Figure 22:
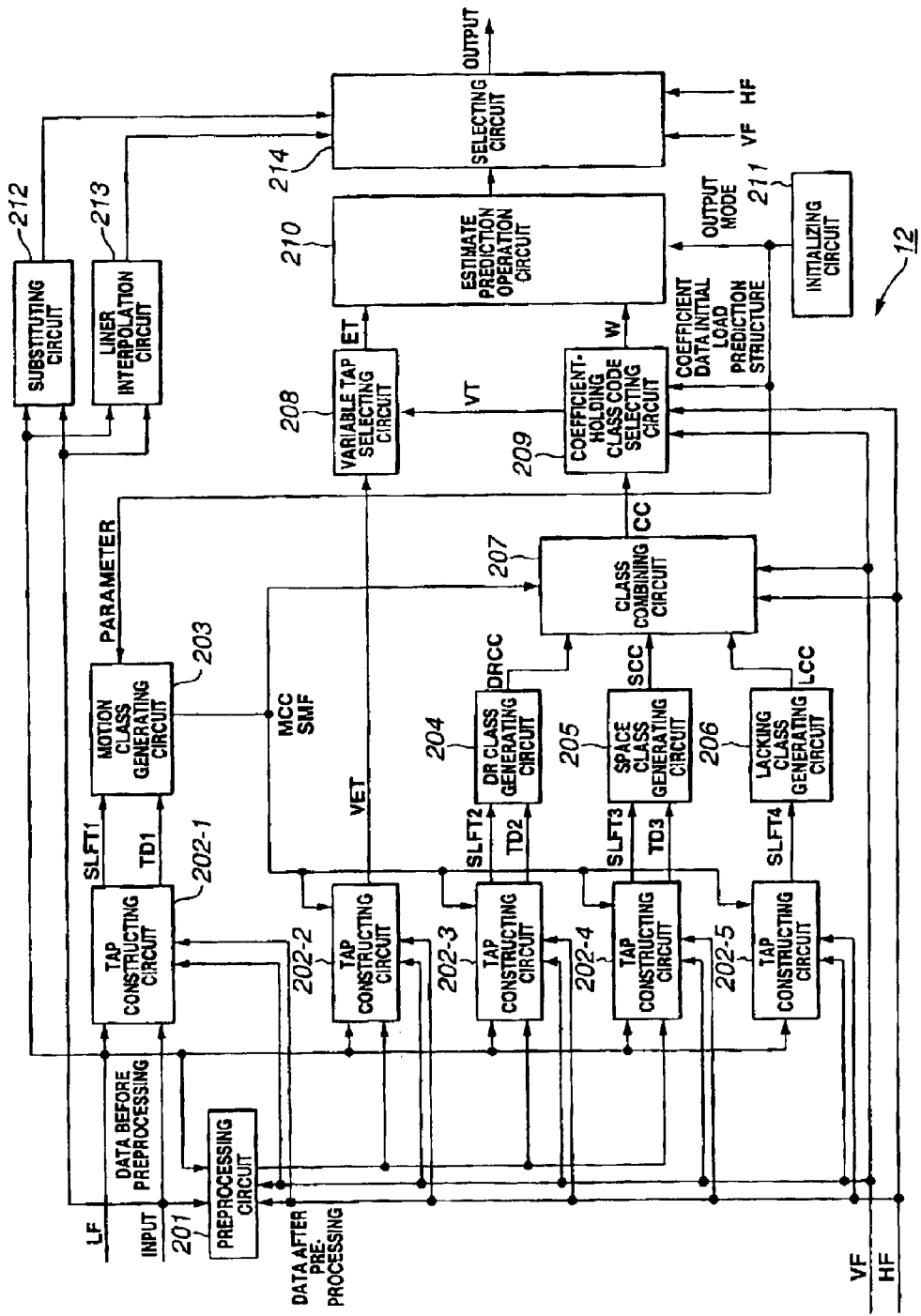
FIG. 22 is a block diagram showing another structure of the lacking pixel creating circuit.

FIG. 22 is a block diagram showing another structure of the lacking pixel creating circuit 12, which carries out the processing shown in FIG. 20 or 21. The pixel value and a lacking flag LF indicating the lack of the pixel as the data inputted to the lacking pixel creating circuit 12 are supplied to a preprocessing circuit 201 and a tap constructing circuit 202-1.

The preprocessing circuit 201 carries out the processing similar to that of the preprocessing circuit 101. The preprocessing circuit 201 generates a value of the lacking pixel by using a linear interpolation filter on the basis of the inputted pixel value and the lacking flag LF indicating the lack of the pixel, then sets the generated value as the pixel value of the lacking pixel, and supplies the value to tap constructing circuits 202-2 to 202-5.

The tap constructing circuit 202-1 supplies the lacking flag LF of the selected pixel as a lacking flag tap SLFT1 to a motion class generating circuit 203. The tap constructing circuit 202-1 selects a motion class tap TD1 consisting of pixels that area within the effective pixel range and are not lacking, and supplies the selected motion class tap TD1 to the motion class generating circuit 203.

The motion class generating circuit 203 generates a motion class code MCC and a static/motion flag SMF on the basis of a parameter supplied from an initializing circuit 211 and the lacking flag LF and the selected motion class tap TD1 supplied from the tap constructing circuit 202-1, and outputs the motion class code MCC and the static/motion flag SMF to the tap constructing circuits 202-2 to 202-5 and a class combining circuit 207. The motion class code MCC is 2-bit information indicating the quantity of motion, and the static/motion flag SMF is 1-bit information indicating the presence/absence of motion. For example, when the motion class code MCC is 0 or 1, the static/motion flag SMF is set at 0. When the motion class code MCC is 2 or 3, the static/motion flag SMF is set at 1.

The tap constructing circuit 202-2 selects an all-class prediction tap VET (not including the pixels outside the effective pixel area) covering all the class structures, on the basis of the motion class code MCC and the static/motion flag SMF supplied from the motion class generating circuit 203 and the lacking flag LF. The tap constructing circuit 202-2 then supplies the all-class prediction tap VET to a variable tap selecting circuit 208.

The tap constructing circuit 202-3 supplies the selected lacking flag LF as a lacking flag tap SLFT2 to a DR class generating circuit 204. The tap constructing circuit 202-3 selects a DR class tap TD2 that is within the effective pixel area and is not lacking, on the basis of the motion class code MCC and the static/motion flag SMF supplied from the motion class generating circuit 203 and the lacking flag LF, and supplies the selected DR class tap TD2 to the DR class generating circuit 204. The DR class generating circuit 204 generates a DR class code DRCC decided in accordance with a dynamic range, that is, the difference between the maximum pixel value and the minimum pixel value of the pixels that are not lacking, on the basis of the lacking flag tap SLFT2 and the DR class tap TD2 supplied from the tap constructing circuit 202-3. The DR class generating circuit 204 then outputs the DR class code DRCC to the class combining circuit 207.

The tap constructing circuit 202-4 supplies the selected lacking flag LF as a, lacking flag tap SLFT3 to a space class generating circuit 205. The tap constructing circuit 202-4 selects a space class tap TD3 that is within the effective pixel area and is not lacking, on the basis of the motion class code MCC and the static/motion flag SMF supplied from the motion class generating circuit 203 and the lacking flag LF, and supplies the selected space class tap TD3 to the space class generating circuit 205. The space class generating circuit 205 generates a space class code SCC corresponding to the pixel value pattern on the basis of the lacking flag tap SLFT3 and the space tap TD3 supplied from the tap constructing circuit 202-4, and outputs the space class code SCC to the class combining circuit 207.

The tap constructing circuit 202-5 selects a lacking flag LF and supplies the selected lacking flag LF as a lacking flag tap SLFT4 to a lacking class generating circuit 206. The lacking class generating circuit 206 generates a Jacking class code LCC on the basis of the lacking flag tap SLFT4 supplied from the tap constructing circuit 202-5, and outputs the lacking class code LCC to the class combining circuit 207.

The class combining circuit 207 combines the motion class code MCC, the static/motion flag SMF, the DR class code DRCC, the space class code SCC and the lacking class code LCC to form a single ultimate class code CC, and outputs the class code CC to a coefficient-holding class code selecting circuit 209.

The coefficient-holding class code selecting circuit 209 generates a prediction tap selecting signal VT on the basis of a coefficient set and a prediction structure supplied from the initializing circuit 211 and the class code CC supplied from the class combining circuit 207, and supplies the generated prediction tap selecting signal VT to the variable tap selecting circuit 208. At the same time, the coefficient-holding class code selecting circuit 209 outputs a prediction coefficient W selected from the coefficient set on the basis of the class code CC, to an estimate prediction operation circuit 210.

The variable tap selecting circuit 208 selects a prediction tap ET on the basis of the all-class prediction tap VET supplied from the tap constructing circuit 202-2 and the prediction tap selecting circuit VT supplied from the coefficient-holding class code selecting circuit 209, and supplies the selected prediction tap ET to the estimate prediction operation circuit 210.

The estimate prediction operation circuit 210 calculates the pixel value of the lacking pixel using a linear estimate formula on the basis of the prediction tap ET supplied from the variable tap selecting circuit 208 and the prediction coefficient W supplied from the coefficient-holding class code selecting circuit 209, and outputs the calculated pixel value to a selecting circuit 214.

The estimate prediction operation circuit 210 is equivalent to the product-sum operation unit 121 of FIG. 8.

A substituting circuit 212 sets a value corresponding to a predetermined dull color (for example, gray) as the pixel value of the lacking pixel on the basis of the lacking flag LF indicating the lack of the pixel, and supplies the value to the selecting circuit 214.

A linear interpolation circuit 213 carries out the processing similar to that of the preprocessing circuit 210. The linear interpolation circuit 213 generates a value of the lacking pixel by using a linear interpolation filter on the basis of the inputted pixel value and the lacking flag LF indicating the lack of the pixel, then sets the value as the pixel value of the lacking pixel, and supplies the value to the selecting circuit 214.

The substituting circuit 212 and the linear interpolation circuit 213 are equivalent to the filter 122 of FIG. 8.

The selecting circuit 214 selects one of the outputs from the estimate prediction operation circuit 210, the substituting circuit 212 and the linear interpolation circuit 213 on the basis of the effective pixel area vertical flag VF and the effective pixel area horizontal flag HF supplied from the effective pixel area calculating circuit 11, and outputs the selected output as the output of the lacking pixel creating circuit 12.

By thus carrying out classification adaptive processing in accordance with changes of the dynamic range, motion, lacking and pixel value, the lacking pixel creating circuit 12 can calculate the pixel value of the lacking pixel on the basis of the pixel values of the pixels around the lacking pixel, and also can interpolate or replace the lacking pixel situated at an edge of the effective pixel area and then output the resultant pixel.

Depending on the position of the lacking pixel as a target of creation, relative to the edge of the image, the lacking pixel creating circuit 12 may suitably switch to the processing described with reference to FIGS. 6, 7, 18 to 21.

Although the class tap includes no lacking pixels in the above description, the pixel value generated by the preprocessing circuit 101 may be included in the class tap and the pixel value generated by the preprocessing circuit 101 may be used for the classification processing.

As described above, the image processing device according to the present invention can constantly generate an image of higher quality regardless of the positions of pixels on the screen. For example, the image processing device can re-create a lacking pixel with little errors regardless of the position of the lacking pixel on the screen.

An image processing device for generating in advance a coefficient set used for the image processing device which selectively carries out one or a plurality of modes of an image processing mode for carrying out lacking pixel creation shown in the example of FIG. 2, an image processing mode in consideration of chromatic aberration, and an image processing mode in consideration of the telop position, will now be described.

Figure 23:
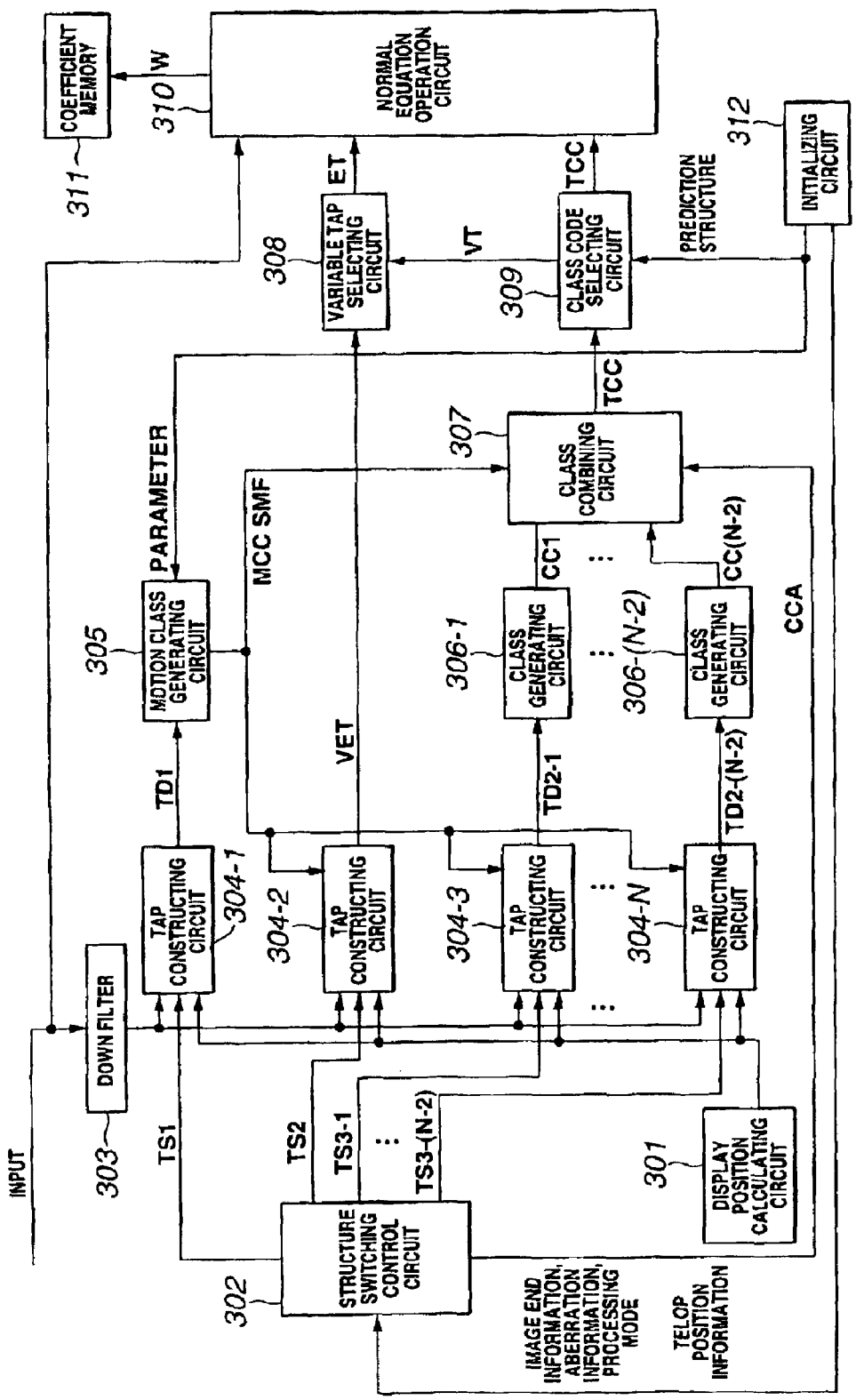
FIG. 23 shows the structure of an embodiment of an image processing device which generates a coefficient set used by the image processing device for selectively carrying out one or a plurality of modes, of an image processing mode for carrying out lacking pixel creation, an image processing in consideration of chromatic aberration, and an image processing mode in consideration of the telop position.

FIG. 23 shows the structure of an embodiment of the image processing device for generating a coefficient set in advance.

An image inputted to the image processing device is supplied to a down filter 303 and a normal equation operation circuit 310.

A display position calculating circuit 301 calculates the distance of each pixel of the image from the center of the screen and supplies position information indicating the distance of each pixel of the image from the center of the screen, to tap constructing circuits 304-1 to 304-N.

The display position calculating circuit 301 may also supply the position information indicating the distance of each pixel from center of the screen, to a structure switching control circuit 302.

An initializing circuit 312 supplies image end information, aberration information, processing mode and telop position information to the structure switching control circuit 302.

When the processing mode indicates the creation of a lacking pixel, the structure switching control circuit 302 supplies a tap selecting signal TS1, a tap selecting signal TS2 and tap selecting signals TS3-1 to TS3-(N-2) corresponding to the image end information to the tap constructing circuits 304-1 to 304-N; respectively. When the processing mode indicates the aberration mode, the structure switching control circuit 302 supplies a tap selecting signal TS1, a tap selecting signal TS2 and tap selecting signals TS3-1 to TS3-(N-2) corresponding to the aberration information to the tap constructing circuits 304-1 to 304-N, respectively. When the processing mode indicates the telop mode, the structure switching control circuit 302 supplies a tap selecting signal TS1, a tap selecting signal TS2 and tap selecting signals TS3-1 to TS3-(N-2) corresponding to the telop position information to the tap constructing circuits 304-1 to 304-N, respectively.

The structure switching control circuit 302 may also select a plurality of processing modes of the three processing modes.

An example of the aberration mode will now be described.

For example, the tap selecting signal TS1, the tap selecting signal TS2 and the tap selecting signals TS3-1 to TS3-(N-2) are constituted by a signal corresponding to red, a signal corresponding to green and signals corresponding to blue, respectively, that is, signals corresponding to RGB.

The structure switching control circuit 302 calculates the distance of each pixel from the center of the screen on the basis of the physical address of each pixel on the screen supplied from the display position calculating circuit 301, and generates an aberration class code CCA consisting of a class code corresponding to red, a class code corresponding to green and a class code corresponding to blue on the basis of the calculated distance from the center of screen and the aberration information inputted from the initializing circuit 312. The structure switching control circuit 302 supplies the generated aberration class code CCA to a class combining circuit 307.

The structure switching control circuit 302 stores in advance the relation between the physical address of each pixel on the screen and the distance of each pixel from the center of the screen, and finds the distance of each pixel from the center of the screen on the basis of the stored relation and the physical address of each pixel on the screen supplied from the display position calculating circuit 301.

Alternatively, the structure switching control circuit 302 may generates an aberration class code CCA consisting of a class code corresponding to red, a class code corresponding to green and a class code corresponding to blue on the basis of the aberration information inputted from the initializing circuit 312 and the distance from the center of the screen supplied from the display position calculating circuit 301, and may supply the generated aberration class code CCA to the class combining circuit 307.

The structure switching control circuit 302 generates the aberration class code CCA, for example, by quantizing the quantity of aberration.

Chromatic aberration will now be described.

For example, when a white light enters obliquely to the optical axis of a lens, as shown in FIG. 24, an image of a blue light included in the white light is formed at a position closer to the optical axis than an image of a yellow light is. The image of the yellow light included in the white light is formed at a position farther from the optical axis than the image of the blue light is and closer to the optical axis than an image of a red light is. The image of the red light included in the white light is formed at a position farther from the optical axis than the image of the yellow light is. Such deviation of image forming position among the blue-light image, the yellow-light image and the red-light image is referred to as chromatic aberration. Large chromatic aberration means a long distance between the image forming positions of the blue-light image, the yellow-light image and the red-light image.

Since the magnitude of chromatic aberration increases correspondingly to the distance between the position of the image and the center of the screen, the pixels on the circumference of a circle around the center of the screen have chromatic aberration of the same magnitude, as shown in FIG. 25A.

This relation between the distance from the center of the screen and the magnitude of chromatic aberration can be shown in the graph of FIG. 25B. That is, chromatic aberration increases non-linearly to the distance from the center of the screen.

The down filter 303 adopts the processing corresponding to aberration or the processing such as jitter addition or noise addition for the inputted image, and supplies an image having a pixel value corresponding to aberration or a jitter-added or noise-added image to the tap constructing circuits 304-1 to 304-N.

The tap constructing circuit 304-1 switches the tap structure for each of red, green and blue on the basis of the position information supplied from the display position calculating circuit 301 and the tap selecting signal TS1 supplied from the structure switching control circuit 302. The tap constructing circuit 304-1 then selects pixels included in the image supplied from the down filter 303 as a motion class tap TD1 corresponding to each of red, green and blue, and supplies the selected motion class tap TD1 to a motion class generating circuit 305. The motion class tap TD1 outputted from the tap constructing circuit 304-1 consists of a tap corresponding to red, a tap corresponding to green and a tap corresponding to blue.

FIGS. 26A to 26C illustrate the tap structures for red, green and blue, respectively, at the tap constructing circuit 304-1. For example, the tap corresponding green is constituted by a tap based on a target pixel as the center, as shown in FIG. 26A.

The structure switching control circuit 302 generates correction vectors for red and blue with reference to green, as shown in FIG. 26B, on the basis of the aberration information inputted from the initializing circuit 312, and supplies the tap selecting signal TS1 including the generated correction vectors to the tap constructing circuit 304-1.

The tap constructing circuit 304-1 selects, for example, a correction target pixel for red with reference to the target pixel on the basis of the position information indicating the distance of each pixel from the center of the screen supplied from the display position calculating circuit 301 and the correction vector for red included in the tap selecting signal TS1, and constructs the tap corresponding to red centering on the correction target pixel, as shown in FIG. 26C. Similarly, the tap constructing circuit 304-1 selects a correction target pixel for blue with reference to the target pixel on the basis of the position information indicating the distance of each pixel from the center of the screen supplied from the display position calculating circuit 301 and the correction vector for blue included in the tap selecting signal TS1, and constructs the tap corresponding to blue centering on the correction target pixel.

The tap constructing circuit 304-1 may also construct a tap selecting signal TS1 including a correction vector for red, a correction vector for green and a correction vector for blue with reference to the target pixel, then construct a tap corresponding to red centering on a correction target pixel for red on the basis of the position information indicating the distance of each pixel from the center of the screen supplied from the display position calculating circuit 301 and the correction vector for red included in the tap selecting signal TS1, then construct a tap corresponding to green centering on a correction target pixel for green on the basis of the position information indicating the distance of each pixel from the center of the screen supplied from the display position calculating circuit 301 and the correction vector for green included in the tap selecting signal TS1, and construct a tap corresponding to blue centering on a correction target pixel for blue on the basis of the position information indicating the distance of each pixel from the center of the screen supplied from the display position calculating circuit 301 and the correction vector for blue included in the tap selecting signal TS1.

The motion class generating circuit 305 generates a motion class code MCC including a motion class code corresponding to red, a motion class code corresponding to green and a motion class code corresponding to blue, and a static/motion flag SMF including a static/motion flag corresponding to red, a static/motion flag corresponding to green and a static/motion flag corresponding to blue, on the basis of the parameter supplied from the initializing circuit 312 and the motion class tap TD1 supplied from the tap constructing circuit 304-1, and outputs the motion class code MCC and the static/motion flag SMF to the tap constructing circuits 304-2 to 304-N and the class combining circuit 307.

The tap constructing circuit 304-2 switches the tap structure for each of red, green and blue on the basis of the motion class code MCC and the static/motion flag SMF for each of red, green and blue supplied from the motion class generating circuit 305, the position information indicating the distance of each pixel from the center of the screen supplied from the display position calculating circuit 301, and the tap selecting signal TS2 supplied from the structure switching control circuit 302. The tap constructing circuit 304-2 selects an all-class prediction tap VET including a tap corresponding to red, a tap corresponding green and a tap corresponding to blue, and supplies the selected all-class prediction tap VET to a variable tap selecting circuit 308.

The tap constructing circuit 304-3 switches the tap structure for each of red, green and blue on the basis of the motion class code MCC and the static/motion flag SMF for each of red, green and blue supplied from the motion class generating circuit 305, the position information indicating the distance of each pixel from the center of the screen supplied from the display position calculating circuit 301, and the tap selecting signal TS3-1 for each of red, green and blue supplied from the structure switching control circuit 302. The tap constructing circuit 304-3 selects a class tap TD2-1 including a tap corresponding to red, a tap corresponding green and a tap corresponding to blue, and supplies the selected class tap TD2-1 to a class generating circuit 306-1.

The class generating circuit 306-1 generates a class code CC1 including a class code corresponding to red, a class code corresponding to green and a class code corresponding to blue on the basis of the class tap TD2-1 supplied from the tap constructing circuit 304-3, and outputs the generated class code CC1 to the class combining circuit 307. The class code CC1 can be, for example, a class code corresponding to the difference between the maximum pixel value and the minimum pixel value included in the class tap TD2-1.

The tap constructing circuits 304-4 to 304-N select class taps TD2-2 to TD2-(N-2) each including a tap corresponding to red, a tap corresponding to green and a tap corresponding to blue, on the basis of the motion class code. MCC and the static/motion flag SMF supplied from the motion class generating circuit 305, the position information indicating the distance of each pixel from the center of the screen supplied from the display position calculating circuit 301, and the tap selecting signals TS3-2 to TS3-(N-2) supplied from the structure switching control circuit 302. The tap constructing circuits 304-4 to 304-N supply the selected class taps TD2-2 to TD2-(N-2) to class generating circuits 306-2 to 306-(N-2), respectively.

The class generating circuits 306-2 to 306-(N-2) generate one of class codes CC2 to CC(N-2) including a class code corresponding to red, a class code corresponding to green and a class code corresponding to blue on the basis of one of the class taps TD2-2 to TD2-(N-2) supplied from the tap constructing circuits 304-3 to 304-N, and output the generated one of the class codes CC2 to CC(N-2) to the class combining circuit 307. One of the class codes CC2 to CC(N-2) may be, for example, a class code corresponding to the pixel value pattern.

The class combining circuit 307 combines the class code corresponding to red included in the aberration class code CCA and the class code corresponding to red included in the class codes CC1 to CC(N-2) to form a class code corresponding to red included in a single ultimate class code TCC, on the basis of the class code corresponding to red included in the motion class code MCC and the static/motion flag corresponding to red included in the static/motion flag SMF.

The class combining circuit 307 combines the class code corresponding to green included in the aberration class code CCA and the class code corresponding to green included in the class codes CC1 to CC(N-2) to form a class code corresponding to green included in the single ultimate class code TCC, on the basis of the class code corresponding to green included in the motion class code MCC and the static/motion flag corresponding to green included in the static/motion flag SMF.

The class combining circuit 307 combines the class code corresponding to blue included in the aberration class code CCA and the class code corresponding to blue included in the class codes CC1 to CC(N-2) to form a class code corresponding to blue included in the single ultimate class code TCC, on the basis of the class code corresponding to blue included in the motion class code MCC and the static/motion flag corresponding to blue included in the static/motion flag. SMF.

The class combining circuit 307 outputs the class code TCC including the class code corresponding to red, the class code corresponding to green and the class code corresponding to blue, to a class code selecting circuit 309.

The class code selecting circuit 309 generates a prediction tap selecting signal VT including the tap corresponding to red, the tap corresponding to green and the tap corresponding to blue on the basis of the class code TCC supplied from the class combining circuit 307. The class code selecting circuit 309 supplies the generated prediction tap selecting signal VT to the variable tap selecting circuit 308 and outputs the class code TCC to the normal equation operation circuit 310.

The variable tap selecting circuit 308 selects a prediction tap ET including the tap corresponding to red, the tap corresponding to green and the tap corresponding to blue on the basis of the all-class prediction tap VET supplied from the tap constructing circuit 304-2 and the prediction tap selecting signal VT supplied from the class code selecting circuit 309, and supplies the selected prediction tap ET to the normal equation operation circuit 310.

On receiving the prediction tap ET, which is the learning data supplied from the variable tap selecting circuit 308, and the input image, which is the teacher data supplied from the down filter 303, the normal equation operation circuit 310 uses these data to calculate a prediction coefficient W for minimizing an error by a minimum square method. The prediction coefficient W includes a prediction coefficient corresponding to red, a prediction coefficient corresponding green and a prediction coefficient corresponding to blue.

The prediction coefficient W calculated by the normal equation operation circuit 310 will be briefly described hereinafter.

For example, it is considered to find a prediction value E[y] of a pixel value y of an original image (equivalent to an inputted image (hereinafter suitably referred to as teacher data)), using a linear combination model prescribed by linear combination of pixel values (hereinafter suitably referred to as learning data) $x_1, x_2, \ldots$ of an image which has noise added thereto or which has a pixel value corresponding to aberration by passing through the down filter 303 and predetermined prediction coefficients $w_1, w_2, \ldots$ In this case, the prediction value E[y] can be expressed by the following equation (3).

$$E[y]=w_1x_1+w_2x_2+ \quad (3)$$

Thus, if a matrix W consisting of a set of prediction coefficients w, a matrix X consisting of a set of learning data, and a matrix Y' consisting of a set of prediction values E[y] are defined as follows for generalization, $$X = \begin{pmatrix} x_{11}, & x_{12}, & \ldots & x_{1n} \\ x_{21}, & x_{22}, & \ldots & x_{2n} \\ \vdots & \vdots & \vdots & \vdots \\ x_{m1}, & x_{m2}, & \ldots & x_{mn} \end{pmatrix}$$

$$W = \begin{pmatrix} W_1 \\ W_2 \\ \vdots \\ W_n \end{pmatrix} \quad Y' = \begin{pmatrix} E[y_1] \\ E[y_2] \\ \vdots \\ E[y_m] \end{pmatrix}$$

the following observation equation is obtained.

$$XW = Y' \tag{4}$$

Then, it is considered to find the prediction value $E[y]$ close to the pixel value y of the original image by adopting the minimum square method for this observation equation. In this case, if a matrix Y consisting of a set of pixel values y of the original image and a matrix E consisting of a set of residuals e of the prediction value $E[y]$ with respect to the pixel value y of the original image are defined as follows, $$E = \begin{pmatrix} e_1 \\ e_2 \\ \ldots \\ e_m \end{pmatrix} \quad Y = \begin{pmatrix} y_1 \\ y_2 \\ \ldots \\ y_m \end{pmatrix}$$

the following residual equation is obtained from the equation (4).

$$XW = Y + E \tag{5}$$

In this case, a prediction coefficient $w_i$ for finding the prediction value $E[y]$ close to the pixel value y of the original image can be found by minimizing the following square error.

$$\sum_{i=1}^{m} e_i^2$$

Therefore, if the above-described square error differentiated by the prediction coefficient $w_i$ is 0, the prediction coefficient $w_i$ satisfying the following equation is an optimum value for finding the prediction value $E[y]$ close to the pixel value y of the original image.

$$e_1 \frac{\partial e_1}{\partial w_i} + e_2 \frac{\partial e_2}{\partial w_i} + \ldots + e_m \frac{\partial e_m}{\partial w_i} = 0 (i = 1, 2, \ldots, n) \tag{6}$$

Thus, first, differentiating the equation (5) by the prediction coefficient $w_i$ provides the following equation.

$$\frac{\partial e_i}{\partial w_1} = x_{i1}, \frac{\partial e_i}{\partial w_2} = x_{i2}, \ldots, \frac{\partial e_i}{\partial w_n} = x_{in} (i = 1, 2, \ldots n) \tag{7}$$

From the equations (6) and (7), the following equation (8) is obtained.

$$\sum_{i=1}^{m} e_i x_{i1} = 0, \sum_{i=1}^{m} e_i x_{i2} = 0, \ldots, \sum_{i=1}^{m} e_i x_{in} = 0 \tag{8}$$

Moreover, in consideration of the relation of the learning data x, the prediction coefficient w, the teacher data y and the residual e in the residual equation (5), the following normal equation can be obtained from the equation (8).

$$\left(\sum_{i=1}^{m} x_{i1} x_{i1}\right) W_1 + \left(\sum_{i=1}^{m} x_{i1} x_{i2}\right) W_2 + \ldots + \left(\sum_{i=1}^{m} x_{i1} x_{in}\right) = \left(\sum_{i=1}^{m} x_{i1} y_i\right)$$

$$\left(\sum_{i=1}^{m} x_{i2} x_{i1}\right) W_1 + \left(\sum_{i=1}^{m} x_{i2} x_{i2}\right) W_2 + \ldots + \left(\sum_{i=1}^{m} x_{i2} x_{in}\right) = \left(\sum_{i=1}^{m} x_{i2} y_i\right) \tag{9}$$

$$\left(\sum_{i=1}^{m} x_{iN} x_{i1}\right) W_1 + \left(\sum_{i=1}^{m} x_{iN} x_{i2}\right) W_2 + \ldots + \left(\sum_{i=1}^{m} x_{iN} x_{in}\right) = \left(\sum_{i=1}^{m} x_{iN} y_i\right)$$

The optimum prediction coefficient w can be found by solving the normal equation (9). In solving the equation (9), it is possible to adopt, for example, a sweep method (Gauss-Jordan elimination method).

Specifically, for example, it is now assumed that the pixel values of the prediction tap ET included in the learning data are $x_1, x_2, x_3, \ldots$ and that the prediction coefficients W to be found are $w_1, w_2, w_3, \ldots$ To find the pixel value y of a certain pixel of the teacher data by linear combination of $x_1, x_2, x_3, \ldots$ and $w_1, w_2, w_3, \ldots$, the prediction coefficients $w_1, w_2, w_3, \ldots$ must satisfy the following equation.

$$y = w_1 x_1 + w_2 x_2 + w_3 x_3 + \ldots$$

Thus, the normal equation operation circuit 310 finds the prediction coefficients $w_1, w_2, w_3, \ldots$ which minimize a square error of the prediction value $w_1 x_1 + w_2 x_2 + w_3 x_3 + \ldots$ relative to the true value y, from the prediction tap of the same class and the pixels of the corresponding teacher data by setting up and solving the above-described normal equation (9).

More specifically, the normal equation operation circuit 310 finds the prediction coefficients $w_1, w_2, w_3, \ldots$ corresponding to red which minimize a square error of the prediction value $w_1 x_1 + w_2 x_2 + w_3 x_3 + \ldots$ relative to the true value y corresponding to red, from the prediction tap of the same class corresponding to red and the red component of the corresponding teacher data by setting up and solving the normal equation.

The normal equation operation circuit 310 finds the prediction coefficients $w_1, w_2, w_3, \ldots$ corresponding to green which minimize a square error of the prediction value $w_1 x_1 + w_2 x_2 + w_3 x_3 + \ldots$ relative to the true value y corresponding to green, from the prediction tap of the same class corresponding to green and the green component of the corresponding teacher data by setting up and solving the normal equation.

The normal equation operation circuit 310 finds the prediction coefficients $w_1, w_2, w_3, \ldots$ corresponding to blue which minimize a square error of the prediction value $w_1 x_1 + w_2 x_2 + w_3 x_3 + \ldots$ relative to the true value y corresponding to blue, from the prediction tap of the same class corresponding to blue and the blue component of the corresponding teacher data by setting up and solving the normal equation.

Therefore, by carrying out this processing for each class, the prediction coefficients W including the prediction coefficient corresponding to red, the prediction coefficient corresponding to green and the prediction coefficient corresponding to blue are generated for each class.

The prediction coefficients W including the prediction coefficient corresponding to red, the prediction coefficient corresponding to green and the prediction coefficient corresponding to blue for each class, found by the normal equation operation circuit 310, are supplied together with the class code TCC to a coefficient memory 311. Thus, the coefficient memory 311 stores the prediction coefficients W from the normal equation operation circuit 310, at the address corresponding to the class indicated by the class code TCC.

As described above, the image processing device shown in FIG. 23 can generate a coefficient set used for the image processing device which selectively carries out one or a plurality of modes of the image processing mode for carrying out lacking pixel creation, the image processing mode in consideration of chromatic aberration and the image processing mode in consideration of the telop position.

The image processing device shown in FIG. 23 may also generate a coefficient set used for the image processing device which carries out image processing in the image processing mode in consideration of chromatic aberration, where an image shot through a lens having aberration and the same image shot through a lens having little aberration are obtained, with the former image used as learning data and the latter image used as teacher data.

Figure 27:
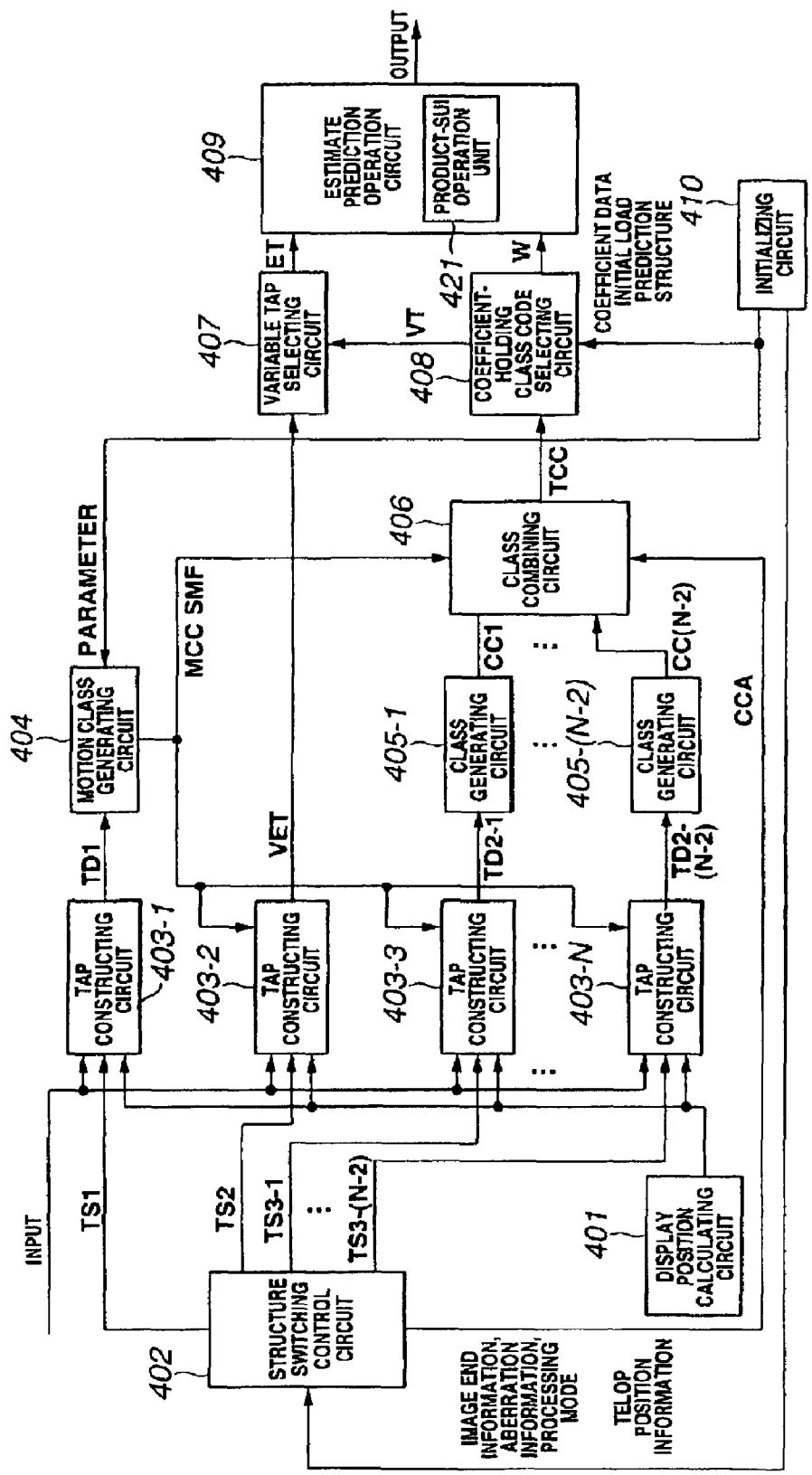
FIG. 27 shows the structure of an embodiment of an image processing device which selectively carries out one or a plurality of modes, of an image processing mode for carrying out lacking pixel creation, an image processing mode in consideration of chromatic aberration, and an image processing mode in consideration of the telop position.

FIG. 27 shows the structure of an embodiment of the image processing device according to the present invention, which selectively carries out one or a plurality of modes of the image processing mode for carrying out lacking pixel creation, the image processing mode in consideration of chromatic aberration and the image processing mode in consideration of the telop position, using the coefficient set generated by the image processing device shown in FIG. 23.

A display position calculating circuit 401 calculates the distance of each pixel of an inputted image from the center of the screen and supplies position information indicating the distance of each pixel from the center of the screen, to tap constructing circuits 403-1 to 403-N.

The display position calculating circuit 401 may also supply the position information indicating the distance of each pixel of the image from center of the screen, to a structure switching control circuit 402.

An initializing circuit 410 supplies image end information, aberration information, processing mode and telop position information to the structure switching control circuit 402.

When the processing mode indicates the creation of a lacking pixel, the structure switching control circuit 402 supplies a tap selecting signal TS1, a tap selecting signal TS2 and tap selecting signals TS3-1 to TS3-(N-2) corresponding to the image end information to the tap constructing circuits 403-1 to 403-N, respectively. When the processing mode indicates the aberration mode, the structure switching control circuit 402 supplies a tap selecting signal TS1, a tap selecting signal TS2 and tap selecting signals TS3-1 to TS3-(N-2) corresponding to the aberration information to the tap constructing circuits 403-1 to 403-N, respectively. When the processing mode indicates the telop mode, the structure switching control circuit 402 supplies a tap selecting signal TS1, a tap selecting signal TS2 and tap selecting signals TS3-1 to TS3-(N-2) corresponding to the telop position information to the tap constructing circuits 403-1 to 403-N, respectively.

The structure switching control circuit 402 may also select a plurality of processing modes of the three processing modes.

An example of the aberration mode will now be described.

For example, the tap selecting signal TS1, the tap selecting signal TS2 and the tap selecting signals TS3-1 to TS3-(N-2) are constituted by a signal corresponding to red, a signal corresponding to green and signals corresponding to blue, respectively, that is, signals corresponding to RGB.

The structure switching control circuit 402 generates an aberration class code CCA consisting of a class code corresponding to red, a class code corresponding to green and a class code corresponding to blue on the basis of the aberration information inputted from the initializing circuit 410, and supplies the generated aberration class code CCA to a class combining circuit 406.

The tap constructing circuit 403-1 switches the tap structure for each of red, green and blue on the basis of the position information supplied from the display position calculating circuit 401 and the tap selecting signal TS1 supplied from the structure switching control circuit 402. The tap constructing circuit 403-1 then selects pixels included in the image supplied from a preprocessing circuit 403 as a motion class tap TD1 corresponding to each of red, green and blue, and supplies the selected motion class tap TD1 to a motion class generating circuit 404. The motion class tap TD1 outputted from the tap constructing circuit 403-1 consists of a tap corresponding to red, a tap corresponding to green and a tap corresponding to blue.

The motion class generating circuit 404 generates a motion class code MCC including a motion class code corresponding to red, a motion class code corresponding to green and a motion class code corresponding to blue, and a static/motion flag SMF including a static/motion flag corresponding to red, a static/motion flag corresponding to green and a static/motion flag corresponding to blue, on the basis of the parameter supplied from the initializing circuit 410 and the motion class tap TD1 supplied from the tap constructing circuit 403-1, and outputs the motion class code MCC and the static/motion flag SMF to the tap constructing circuits 403-2 to 403-N and the class combining circuit 406.

The tap constructing circuit 403-2 switches the tap structure for each of red, green and blue on the basis of the motion class code MCC and the static/motion flag SMF for each of red, green and blue supplied from the motion class generating circuit 404 and the tap selecting signal TS2 supplied from the structure switching control circuit 402. The tap constructing circuit 403-2 selects an all-class prediction tap VET including a tap corresponding to red, a tap corresponding green and a tap corresponding to blue, and supplies the selected all-class prediction tap VET to a variable tap selecting circuit 407.

The tap constructing circuit 403-3 switches the tap structure for each of red, green and blue on the basis of the motion class code MCC and the static/motion flag SMF for each of red, green and blue supplied from the motion class generating circuit 404 and the tap selecting signal TS3-1 for each of red, green and blue supplied from the structure switching control circuit 402. The tap constructing circuit 403-3 selects a class tap TD2-1 including a tap corresponding to red, a tap corresponding green and a tap corresponding to blue, and supplies the selected class tap TD2-1 to a class generating circuit 405-1.

The class generating circuit 405-1 generates a class code CC1 including a class code corresponding to red, a class code corresponding to green and a class code corresponding to blue on the basis of the class tap TD2-1 supplied from the tap constructing circuit 403-3, and outputs the generated class code CC1 to the class combining circuit 406. The class code CC1 can be, for example, a code corresponding to the difference between the maximum pixel value and the minimum pixel value of the pixels included in the class tap TD2-1.

The tap constructing circuits 403-4 to 403-N select one of class taps TD2-2 to TD2-(N-2) each including a tap corresponding to red, a tap corresponding to green and a tap corresponding to blue, on the basis of the motion class code MCC and the static/motion flag SMF supplied from the motion class generating circuit 404 and the tap selecting signals TS3-2 to TS3-(N-2) supplied from the structure switching control circuit 402, and supply the selected one of the class taps TD2-2 to TD2-(N-2) to class generating circuits 405-2 to 405-(N-2).

The class generating circuits 405-2 to 405-(N-2) generate one of class codes CC2 to CC(N-2) including a class code corresponding to red, a class code corresponding to green and a class code corresponding to blue on the basis of one of the class taps TD2-2 to TD2-(N-2) supplied from one of the tap constructing circuits 403-3 to 403-N, and output the generated one of the class codes CC2 to CC(N-2) to the class combining circuit 406. The class code CC2 may be, for example, a class code corresponding to the pixel value pattern.

The class combining circuit 406 combines the class code corresponding to red included in the aberration class code CCA and the class code corresponding to red included in the class codes CC1 to CC(N-2) to form a class code corresponding to red included in a single ultimate class code TCC, on the basis of the class code corresponding to red included in the motion class code MCC and the static/motion flag corresponding to red included in the static/motion flag SMF.

The class combining circuit 406 combines the class code corresponding to green included in the aberration class code CCA and the class code corresponding to green included in the class codes CC1 to CC(N-2) to form a class code corresponding to green included in the single ultimate class code TCC, on the basis of the class code corresponding to green included in the motion class code MCC and the static/motion flag corresponding to green included in the static/motion flag SMF.

The class combining circuit 406 combines the class code corresponding to blue included in the aberration class code CCA and the class code corresponding to blue included in the class codes CC1 to CC(N-2) to form a class code corresponding to blue included in the single ultimate class code TCC, on the basis of the class code corresponding to blue included in the motion class code MCC and the static/motion flag corresponding to blue included in the static/motion flag SMF.

The class combining circuit 406 outputs the class code TCC including the class code corresponding to red, the class code corresponding to green and the class code corresponding to blue, to a coefficient-holding class code selecting circuit 408.

The coefficient-holding class code selecting circuit 408 stores in advance a prediction tap selecting signal VT and a coefficient set corresponding to the class code TCC, which are supplied from the initializing circuit 410.

The coefficient-holding class code selecting circuit 408 generates the prediction tap selecting signal VT including the tap corresponding to red, the tap corresponding to green and the tap corresponding to blue on the basis of the class code TCC supplied from the class combining circuit 406, and supplies the generated prediction tap selecting signal VT to the variable tap selecting circuit 407. At the same time, the coefficient-holding class code selecting circuit 408 outputs prediction coefficients W consisting of a prediction coefficient corresponding to the class code for red included in the class code TCC, a prediction coefficient corresponding to the class code for green included in the class code TCC and a prediction coefficient corresponding to the class code for blue included in the class code TCC, to an estimate prediction operation circuit 409.

The variable tap selecting circuit 407 selects a prediction tap ET including the tap corresponding to red, the tap corresponding to green and the tap corresponding to blue on the basis of the all-class prediction tap VET supplied from the tap constructing circuit 403-2 and the prediction tap selecting signal VT supplied from the coefficient-holding class code selecting circuit 408, and supplies the selected prediction tap ET to the estimate prediction operation circuit 409.

A product-sum operation unit 421 of the estimate prediction operation circuit 409 calculates a red component of the pixel value using a linear estimate formula on the basis of the tap corresponding to red included in the prediction tap ET supplied from the variable tap selecting circuit 407 and the prediction coefficient corresponding to red included in the prediction coefficients W supplied from the coefficient-holding class code selecting circuit 408.

The product-sum operation unit 421 of the estimate prediction operation circuit 409 calculates a green component of the pixel value using a linear estimate formula on the basis of the tap corresponding to green included in the prediction tap ET supplied from the variable tap selecting circuit 407 and the prediction coefficient corresponding to green included in the prediction coefficients W supplied from the coefficient-holding class code selecting circuit 408.

The product-sum operation unit 421 of the estimate prediction operation circuit 409 calculates a blue component of the pixel value using a linear estimate formula on the basis of the tap corresponding to blue included in the prediction tap ET supplied from the variable tap selecting circuit 407 and the prediction coefficient corresponding to blue included in the prediction coefficients W supplied from the coefficient-holding class code selecting circuit 408.

The product-sum operation unit 421 of the estimate prediction operation circuit 409 may also calculate the pixel value of the lacking pixel using a nonlinear estimate formula on the basis of the prediction coefficients W.

In this manner, the image processing device shown in FIG. 27 can selectively carry out one or a plurality of modes of the image processing mode for carrying out lacking pixel creation, the image processing mode in consideration of chromatic aberration and the image processing mode in consideration of the telop position, and can provide a sharper image than the conventional device.

Figure 28:
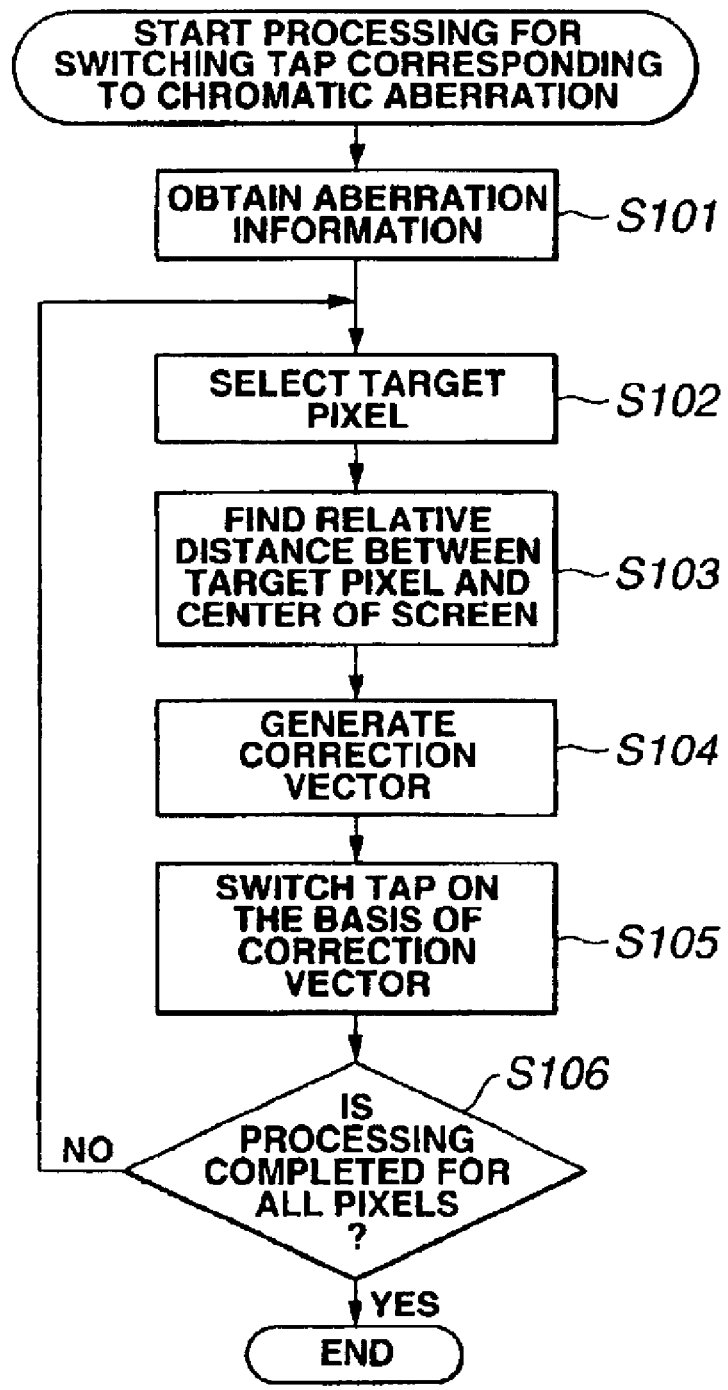
FIG. 28 is a flowchart for explaining the tap switching processing corresponding to chromatic aberration.

The tap switching processing corresponding to chromatic aberration in the aberration mode in the image processing device shown in FIG. 23 will now be described with reference to the flowchart of FIG. 28. At step S101, the structure switching control circuit 302 obtains aberration information supplied from the initializing circuit 312.

At step S102, the structure switching control circuit 302 selects a target pixel. At step S103, the display position calculating circuit 301 finds the relative distance between the target pixel and the center of the screen. At step S104, the structure switching control circuit 302 generates a correction vector for red, a correction vector for green and a correction vector for blue, and supplies a tap selecting signal TS1 including the correction vectors to the tap constructing circuit 304-1, a tap selecting signal TS2 including the correction vectors to the tap constructing circuit 304-2, and tap selecting signals TS3-1 to TS3-(N-2) including the correction vectors to the tap constructing circuits 304-3 to 304-N, respectively.

At step S105, the tap constructing circuit 304-1 switches the tap on the basis of the position information indicating the relative distance between the target pixel and the center of the screen, and the correction vector for red, the correction vector for green and the correction vector for blue, and selects a motion class tap TD1 corresponding to each of red, green and blue. The tap constructing circuit 304-2 switches the tap on the basis of the position information indicating the relative distance between the target pixel and the center of the screen, and the correction vector for red, the correction vector for green and the correction vector for blue, and selects an all-class prediction tap VET corresponding to each of red, green and blue. The tap constructing circuits 304-3 to 304-N switch the tap on the basis of the position information indicating the relative distance between the target pixel and the center of the screen, and the correction vector for red, the correction vector for green and the correction vector for blue, and respectively select DR class taps TD2-1 to TD2-(N-2) corresponding to each of red, green and blue.

At step S106, the image processing device discriminates whether or not the processing is completed for all the pixels. If it is determined that the processing is not completed for all the pixels, the image processing device returns to step S102 and repeats the tap switching processing.

As described above, in the aberration mode, the image processing device shown in FIG. 23 can switch the tap correspondingly to the screen position in consideration of aberration.

In the aberration mode, the image processing device shown in FIG. 27 switches the tap correspondingly to the screen position in accordance with the processing similar to the processing described with reference to the flowchart of FIG. 28. Therefore, the processing will not be described further in detail.

Another processing carried out by the image processing device shown in FIG. 23 and the image processing device shown in FIG. 27 will now be described.

In the image processing device shown in FIG. 23, when the telop mode is designated by the initializing circuit 312, the structure switching control circuit 302 obtains telop position information indicating a telop display area for displaying a telop. The telop position information indicates the position and size of the telop display area such as upper 30 lines, lower 50 lines, or right 100 pixels.

The structure switching control circuit 302 may also obtain data indicating the telop display area from the inputted image.

Figure 29B:
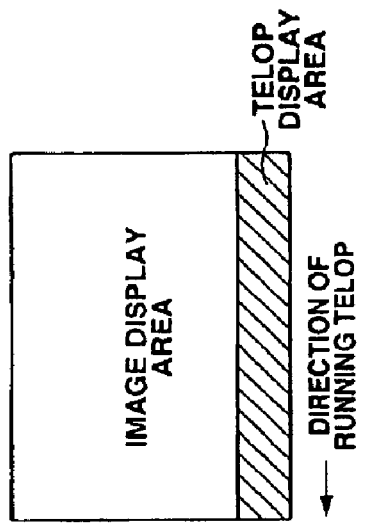
FIGS. 29A to 29D show exemplary screens in which a telop or the like is displayed.
Figure 29A:
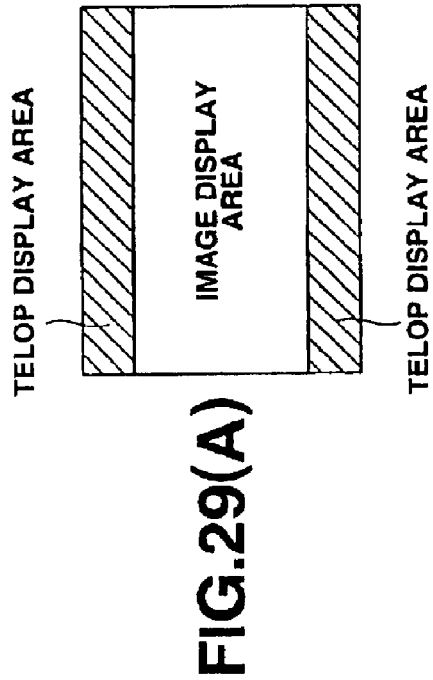

FIGS. 29A to 29D show examples of the screen in which a telop or the like is displayed. In the example of FIG. 29A, an image and corresponding characters are displayed in telop display areas in the upper and lower parts of the image display area. Since the image in the telop display areas includes a large quantity of flat parts and edge parts, its signal characteristic are different from those of a natural image or the like.

In the example of FIG. 29B, characters displayed in a telop display area in the lower part of the image display area are caused to run on the image, from the right side to the left side of the screen.

Figure 29D:
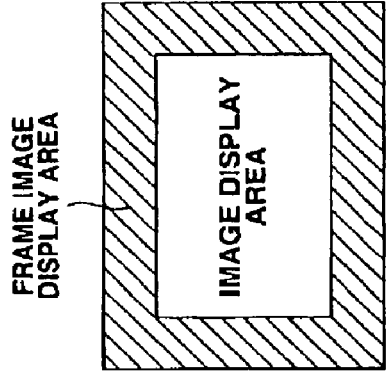
Figure 29C:
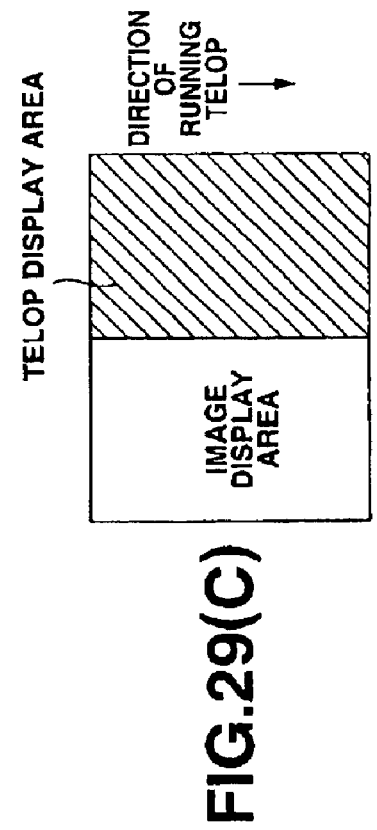

In the example of FIG. 29C, characters displayed in a telop display area on the right half part of the screen are caused to run on the image, from the upper side to the lower side of the screen.

In the example of FIG. 29D, an image generated by computer graphics is displayed in a frame image display area on the four sides surrounding the image display area.

An exemplary operation of the image processing device of FIG. 23 in the telop mode will now be described.

The display position calculating circuit 301 calculates the physical address on the screen of each pixel of an inputted image and supplies the calculated physical address to the tap constructing circuits 304-1 to 304-N.

The structure switching control circuit 302 generates a tap selecting signal TS1, a tap selecting signal TS2 and tap selecting signals TS3-1 to TS3-(N-2) on the basis of the telop position information, and supplies the tap selecting signal TS1 to the tap constructing circuit 304-1, the tap selecting signal TS2 to the tap constructing circuit 304-2, and the tap selecting signals TS3-1 to TS3-(N-2) to the tap constructing circuits 304-3 to 304-N, respectively.

On the basis of the physical address of each pixel on the screen and the tap selecting signal TS1, the tap constructing circuit 304-1 selects, for example, a tap using a broader range of pixels when the target pixel belongs to the image display area, and a tap using a narrower range of pixels when the target pixel belongs to the telop display area. Thus, the tap constructing circuit 304-1 selects a motion class tap TD1. For example; by selecting a tap using a broader range of pixels when a natural image is displayed in the image display area, the image processing device can carry out image processing using an image component which gently changes over a large number of pixels.

On the other hand, in the telop display area in which characters are displayed, the pixel values of pixels corresponding to the characters are substantially the same value and the pixel values of pixels corresponding to the background are substantially the same value. For example, the pixel values of pixels corresponding to the characters displayed in white and the pixel values of pixels corresponding to the background displayed in black are largely different.

That is, in the telop display area, the value of a tap across the characters and the background changes abruptly. The value of a tap consisting of only the characters or only the background changes little. Therefore, by selecting a tap of a narrower range for the telop display area, the image processing device can carry out classification or adaptive processing corresponding appropriately to an image with an abruptly changing pixel value.

When characters are displayed to run in the horizontal direction of the screen in the telop display area as shown in FIG. 29B, by selecting a horizontally long tap with respect to the telop display area, the image processing device can carry out more effective image processing which realizes a high noise elimination effect even with less classes. When characters are displayed to run tin the vertical direction of the screen in the telop display area as shown in FIG. 29C, the image processing device can carry out more effective image processing by selecting a vertically long tap with respect to the telop display area.

In this manner, the image processing device carries out optimal signal processing by using different tap structures and prediction coefficients W for the telop display area and the image display area.

Figure 30:
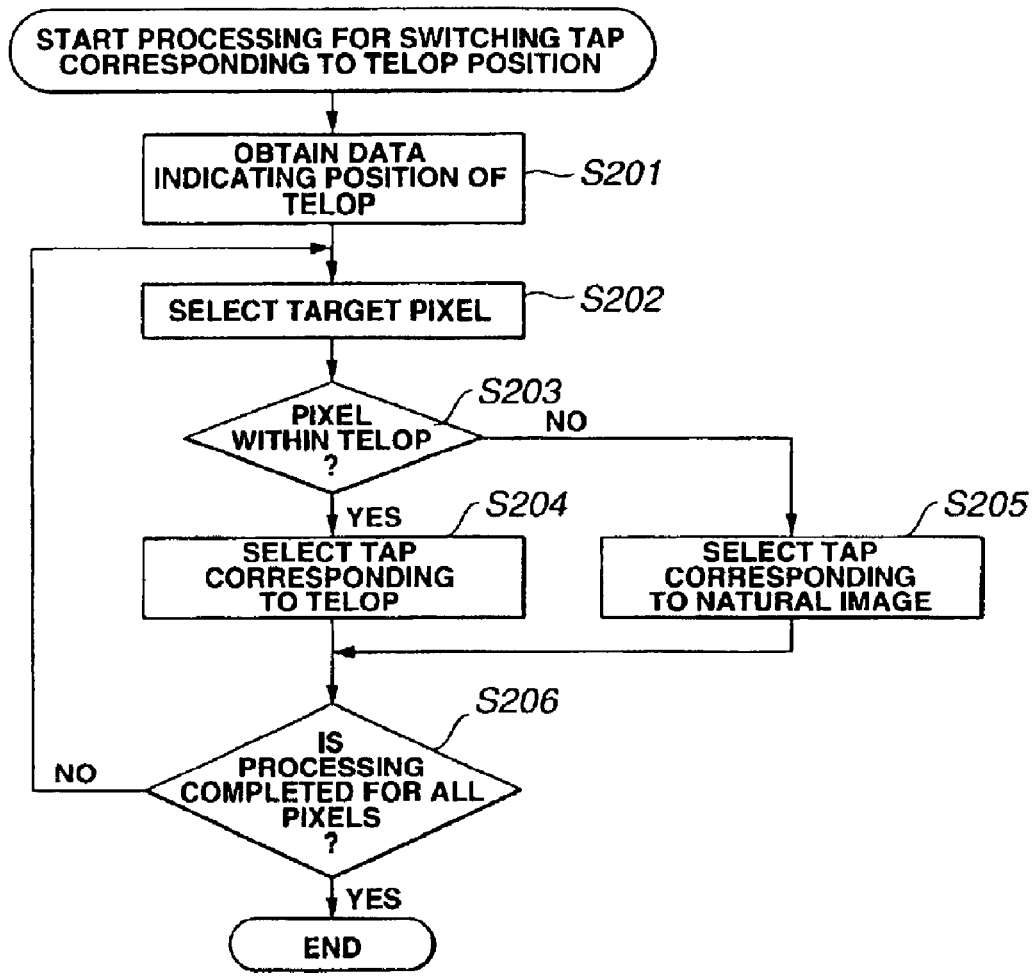
FIG. 30 is a flowchart for explaining the tap switching processing corresponding to the telop position.

The tap switching processing corresponding to the telop position in the image processing device shown in FIG. 23 in the telop mode will now be described with reference to the flowchart of FIG. 30.

At step S201, the structure switching control circuit 302 obtains telop position information supplied from the initializing circuit 312. The structure switching control circuit 302 generates a tap selecting signal TS1, a tap selecting signal TS2 and tap selecting signals TS3-1 to TS3-(N-2) corresponding to the position of the telop, and supplies the tap selecting signal TS1 to the tap constructing circuit 304-1, the tap selecting signal TS2 to the tap constructing circuit 304-2, and the tap selecting signals TS3-1 to TS3-(N-2) to the tap constructing circuits 304-3 to 304-N, respectively.

At step S202, the tap constructing circuit 304-1 selects a target pixel. The tap constructing circuit 304-2 selects a target pixel. The tap constructing circuits 304-3 to 304-N select targets pixels, respectively.

At step S203, the tap constructing circuit 304-1 discriminates whether the target pixel is a pixel within the telop or not, on the basis of the physical address of each pixel on the screen and the tap selecting signal TS1. If it is determined that the target pixel is a pixel within the telop, the processing goes to step S204 and the tap constructing circuit 304-1 switches the tap and selects a motion class tap TD1 corresponding to the telop. Then, the processing goes to step S206.

If it is determined at step S203 that the target pixel is not a pixel within the telop, the processing goes to step S205 and the tap constructing circuit 304-1 switches the tap and selects a motion class tap TD1 corresponding to a natural image. Then, the processing goes to step S206.

At steps S203 to S205, the tap constructing circuits 304-2 to 304-N carry out the processing similar to that of the tap constructing circuit 304-1. Therefore, the processing will not be described further in detail.

At step S206, the tap constructing circuits 304-1 to 304-N discriminate whether or not the processing is completed for all the pixels. If it is determined that the processing is not completed for all the pixels, the processing returns to step S202 to repeat the tap switching processing.

If it is determined at step S206 that the processing is completed for all the pixels, the processing ends.

In this manner, in the telop mode, the image processing device shown in FIG. 23 can switch the tap correspondingly to whether or not the target pixel belongs to the telop display area.

In the telop mode, the image processing device shown in FIG. 27 switches the tap correspondingly to whether or not the target pixel belongs to the telop display area, in accordance with the processing similar to the processing described with reference to the flowchart of FIG. 30. Therefore, the processing will not be described further in detail.

With respect to the image shown in FIG. 29D, the image processing device shown in FIG. 23 or FIG. 27 carries out processing by switching the tap of the frame image display area and the tap of the image display area.

The above-described series of processing can be executed by hardware or can be executed by software. When the series of processing is executed by software, a program constituting the software is installed from a recording medium, for example, to a general-purpose personal computer capable of executing various functions, by installing a computer incorporated in the hardware or various programs.

Figure 31:
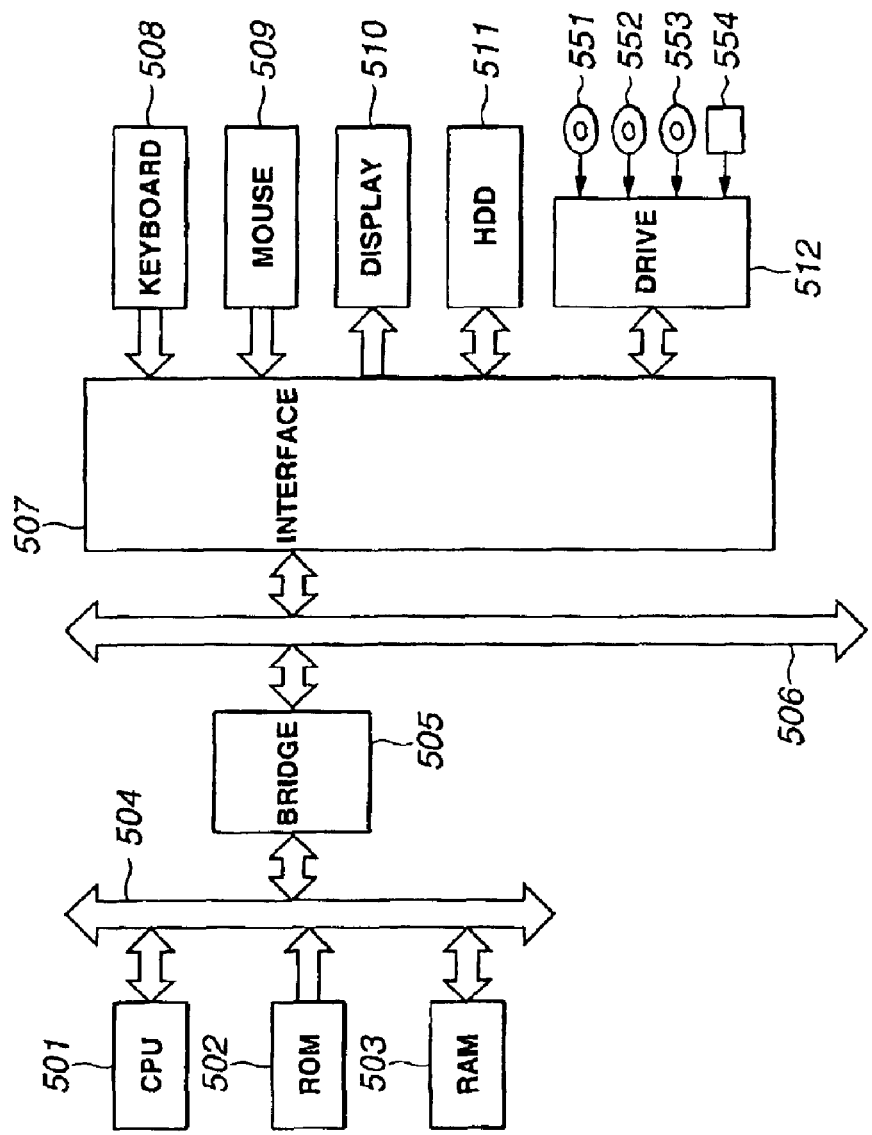
FIG. 31 illustrates a recording medium.

FIG. 31 illustrates an exemplary recording medium and computer. A CPU (central processing unit) 501 actually executes various application programs and OS (operating system). A ROM (read-only memory) 502, in general, basically stores fixed data of the programs and operation parameters used by the CPU 501. A RAM (random access memory) 503 stores the programs used for execution by the CPU 501 and the parameters suitably changing in the execution. These units are interconnected by a host bus 504 made up of a CPU bus or the like.

The host bus 504 is connected to an external bus 506 such as a PCI (peripheral component interconnect/interface) via a bridge 505.

A keyboard 508 is operated by the user when the user inputs various instructions to the CPU 501. A mouse 509 is operated by the user when the user designates or selects a point on the screen of a display 510. The display 510 is made up of a liquid crystal display or a CRT (cathode ray tube) and displays various types of information as texts and images. An HDD (hard disk drive) 511 drives a hard disk, thus recording or reproducing the programs and information executed by the CPU 501 to or from the hard disk.

A drive 512 reads out data or a program recorded on a magnetic disk 551, an optical disc 552, a magneto-optical disc 553 or a semiconductor memory 554 loaded thereon, and supplies the data or program to the RAM 503 connected via an interface 507, the external bus 506, the bridge 505 and the host bus 504.

The units of the keyboard 508 to the drive 512 are connected to the interface 507, and the interface 507 is connected to the CPU 501 via the external bus 506, the bridge 505 and the host bus 504.

The recording media are constituted not only by the removable media such as the magnetic disk 551 (including a floppy disk), the optical disc 552 (including CD-ROM (compact disc-read only memory) and DVD (digital versatile disc)), the magneto-optical disc 553 (including MD (mini-disc)) and the semiconductor memory 554 having the programs recorded thereon, which are distributed to provide the user with the programs for executing the processing corresponding to the block diagram separately from the computer, as shown in FIG. 23, but also by the ROM 502 and the HDD 511 having the programs recorded thereon, which are incorporated in the computer in advance and thus provided for the user.

The programs for executing the processing corresponding to the block diagram for the user may also be supplied to the computer via a wired or radio communication medium.

In this specification, the steps describing the programs stored in the recording media include the processing which is carried out in time series along the described order and also the processing which is not necessarily carried out in time series but is carried out in parallel or individually.

As described above, with the image processing device and method and the recording medium according to the present invention, position information indicating the position within a frame, of a target pixel of an input image signal consisting of a plurality of pixels, is detected, and the class of the target pixel is determined from a plurality of classes in accordance with the position information. A plurality of pixels are selected from the input image signal as a prediction tap, and arithmetic processing based on conversion data obtained in advance by learning for each of the classes and the prediction tap is carried out, thus outputting an output image signal of higher quality than the input image signal. Therefore, an image of higher quality can be constantly generated regardless of the position of the pixel on the screen.

Moreover, with the image processing device and method and the recording medium according to the present invention, position information indicating the position within a frame, of a target pixel of an input image signal consisting of a plurality of pixels, is detected, and a plurality of pixels having their positional relations with the target pixel varied in accordance with the position information are selected from the input image signal as a class tap. The class of the target pixel is selected from a plurality of classes in accordance with the class tap, and a plurality of pixels are selected from the input image signal as a prediction tap. Arithmetic processing based on conversion data obtained in advance by learning for each of the classes and the prediction tap is carried out, thus outputting an output image signal of higher quality than the input image signal. Therefore, an image of higher quality can be constantly generated regardless of the position of the pixel on the screen.

Furthermore, with the image processing device and method and the recording medium according to the present invention, position information indicating the position within a frame, of a target pixel of an input image signal consisting of a plurality of pixels, is detected, and a plurality of pixels are selected from the input image signal as a class tap. The class of the target pixel is determined from a plurality of classes in accordance with the class tap, and a plurality of pixels having their positional relations with the target pixel varied in accordance with the position information are selected from the input image signal as a prediction tap. Arithmetic processing based on conversion data obtained in advance by learning for each of the classes and the prediction tap is carried out, thus outputting an output image signal of higher quality than the input image signal. Therefore, an image of higher quality can be constantly generated regardless of the position of the pixel on the screen.

In addition, with the image processing device and method and the recording medium according to the present invention, a plurality of pixels are selected from an input image signal as a provisional class tap, for each target pixel of the input image signal consisting of a plurality of pixels, and a plurality of pixels having their positional relations with the target pixel varied in accordance with the position of the provisional class tap within a frame are selected from the input image signal as a true class tap. The class of the target pixel is determined from a plurality of classes on the basis of the true class tap, and a plurality of pixels are selected from the input image signal as a prediction tap. Arithmetic processing based on conversion data obtained in advance by learning for each of the classes and the prediction tap is carried out, thus outputting an output image signal of higher quality than the input image signal. Therefore, an image of higher quality can be constantly generated regardless of the position of the pixel on the screen.

Moreover, with the image processing device and method and the recording medium according to the present invention, a plurality of pixels are selected from an input image signal as a class tap, for each target pixel of the input image signal consisting of a plurality of pixels, and the class of the target pixel is determined from a plurality of classes on the basis of the class tap. A plurality of pixels for said each target pixel are selected from the input image signal as a provisional prediction tap, and a plurality of pixels having their positional relations with the target pixel varied in accordance with the position of the provisional prediction tap within a frame are selected from the input image signal as a true prediction tap. Arithmetic processing based on conversion data obtained in advance by learning for each of the classes and the true prediction tap is carried out, thus outputting an output image signal of higher quality than the input image signal. Therefore, an image of higher quality can be constantly generated regardless of the position of the pixel on the screen.

What is claimed is:

1. An image processing device comprising:
    position detecting means for detecting position information indicating the position within a frame, of a target pixel of an input image signal consisting of a plurality of pixels;
    class determining means for determining the class of the target pixel from a plurality of classes in accordance with the position information;
    prediction tap selecting means for selecting a plurality of pixels from the input image signal as a prediction tap; and
    operation means for carrying out arithmetic processing based on conversion data obtained in advance by learning for each of the classes and the prediction tap, thus outputting an output image signal of higher quality than the input image signal.

2. The image processing device as claimed in claim 1, wherein the class determining means determines the class in accordance with which of an effective area and an invalid area in the frame is indicated by the position information.

3. The image processing device as claimed in claim 1, wherein the class determining means determines the class on the basis of the distance from the center of the frame indicated by the position information.

4. The image processing device as claimed in claim 1, wherein the class determining means determines the class on the basis of whether or not the position information indicates the coincidence with the position where a telop is inserted in the frame.

5. The image processing device as claimed in claim 1, further comprising target pixel determining means for determining the target pixel in accordance with the motion of a provisional target pixel of the input image signal.

6. The image processing device as claimed in claim 5, further comprising motion detecting means for detecting the motion of the provisional target pixel.

7. The image processing device as claimed in claim 1, wherein the operation means outputs an image signal including information about a lacking pixel included in the input image signal, as the output image signal.

8. The image processing device as claimed in claim 1, wherein the operation means outputs an image signal having less noise than the input image signal, as the output image signal.

9. The image processing device as claimed in claim 1, wherein the operation means outputs an image signal having a higher resolution than the input image signal, as the output image signal.

10. The image processing device as claimed in claim 1, wherein the operation means outputs an image signal having less distortion due to the aberration of a lens than the input image signal, as the output image signal.

11. An image processing method comprising:
    a position detecting step of detecting position information indicating the position within a frame, of a target pixel of an input image signal consisting of a plurality of pixels;
    a class determining step of determining the class of the target pixel from a plurality of classes in accordance with the position information;
    a prediction tap selecting step of selecting a plurality of pixels from the input image signal as a prediction tap; and
    an operation step of carrying out arithmetic processing based on conversion data obtained in advance by learning for each of the classes and the prediction tap, thus outputting an output image signal of higher quality than the input image signal.

12. A recording medium having recorded thereon a program for causing a computer to execute image processing, the program comprising:

a position detecting step of detecting position information indicating the position within a frame, of a target pixel of an input image signal consisting of a plurality of pixels;

a class determining step of determining the class of the target pixel from a plurality of classes in accordance with the position information;

a prediction tap selecting step of selecting a plurality of pixels from the input image signal as a prediction tap; and an operation step of carrying out arithmetic processing based on conversion data obtained in advance by learning for each of the classes and the prediction tap, thus outputting an output image signal of higher quality than the input image signal.

13. An image processing device comprising:

position detecting means for detecting position information indicating the position within a frame, of a target pixel of an input image signal consisting of a plurality of pixels;

class tap selecting means for selecting a plurality of pixels having their positional relations with the target pixel varied in accordance with the position information, from the input image signal, as a class tap;

class determining means for determining the class of the target pixel from a plurality of classes in accordance with the class tap;

prediction tap selecting means for selecting a plurality of pixels from the input image signal as a prediction tap; and operation means for carrying out arithmetic processing based on conversion data obtained in advance by learning for each of the classes and the prediction tap, thus outputting an output image signal of higher quality than the input image signal.

14. The image processing device as claimed in claim 13, wherein the class tap selecting means selects, as the class tap, a plurality of pixels varied in accordance with which of an effective area and an invalid area in the frame is indicated by the position information.

15. The image processing device as claimed in claim 13, wherein the class tap selecting means selects, as the class tap, a plurality of pixels varied on the basis of the distance from the center of the frame indicated by the position information.

16. The image processing device as claimed in claim 13, wherein the class tap selecting means selects, as the class tap, a plurality of pixels varied on the basis of whether or not the position information indicates the coincidence with the position where a telop is inserted in the frame.

17. The image processing device as claimed in claim 13, further comprising target pixel determining means for determining the target pixel in accordance with the motion of a provisional target pixel of the input image signal.

18. The image processing device as claimed in claim 17, further comprising motion detecting means for detecting the motion of the provisional target pixel.

19. The image processing device as claimed in claim 13, wherein the operation means outputs an image signal including information about a lacking pixel included in the input image signal, as the output image signal.

20. The image processing device as claimed in claim 13, wherein the operation means outputs an image signal having less noise than the input image signal, as the output image signal.

21. The image processing device as claimed in claim 13, wherein the operation means outputs an image signal having a higher resolution than the input image signal, as the output image signal.

22. The image processing device as claimed in claim 13, wherein the operation means outputs an image signal having less distortion due to the aberration of a lens than the input image signal, as the output image signal.

23. An image processing method comprising:

a position detecting step of detecting position information indicating the position within a frame, of a target pixel of an input image signal consisting of a plurality of pixels;

a class tap selecting step of selecting a plurality of pixels having their positional relations with the target pixel varied in accordance with the position information, from the input image signal, as a class tap;

a class determining step of determining the class of the target pixel from a plurality of classes in accordance with the class tap;

a prediction tap selecting step of selecting a plurality of pixels from the input image signal as a prediction tap; and an operation step of carrying out arithmetic processing based on conversion data obtained in advance by learning for each of the classes and the prediction tap, thus outputting an output image signal of higher quality than the input image signal.

24. A recording medium having recorded thereon a program for causing a computer to execute image processing, the program comprising:

a position detecting step of detecting position information indicating the position within a frame, of a target pixel of an input image signal consisting of a plurality of pixels;

a class tap selecting step of selecting a plurality of pixels having their positional relations with the target pixel varied in accordance with the position information, from the input image signal, as a class tap;

a class determining step of determining the class of the target pixel from a plurality of classes in accordance with the class tap;

a prediction tap selecting step of selecting a plurality of pixels from the input image signal as a prediction tap; and an operation step of carrying out arithmetic processing based on conversion data obtained in advance by learning for each of the classes and the prediction tap, thus outputting an output image signal of higher quality than the input image signal.

25. An image processing device comprising:

position detecting means for detecting position information indicating the position within a frame, of a target pixel of an input image signal consisting of a plurality of pixels;

class tap selecting means for selecting a plurality of pixels from the input image signal as a class tap;

class determining means for determining the class of the target pixel from a plurality of classes in accordance with the class tap;

prediction tap selecting means for selecting a plurality of pixels having their positional relations with the target pixel varied in accordance with the position information, from the input image signal as a prediction tap; and operation means for carrying out arithmetic processing based on conversion data obtained in advance by learning for each of the classes and the prediction tap, thus outputting an output image signal of higher quality than the input image signal.

26. The image processing device as claimed in claim 25, wherein the prediction tap selecting means selects, as the prediction tap, a plurality of pixels with their positional relations varied in accordance with which of an effective area and an invalid area in the frame is indicated by the position information.

27. The image processing device as claimed in claim 25, wherein the prediction tap selecting means selects, as the prediction tap, a plurality of pixels with their positional relations varied on the basis of the distance from the center of the frame indicated by the position information.

28. The image processing device as claimed in claim 25, wherein the prediction tap selecting means selects, as the prediction tap, a plurality of pixels with their positional relations varied on the basis of whether or not the position information indicates the coincidence with the position where a telop is inserted in the frame.

29. The image processing device as claimed in claim 25, further comprising target pixel determining means for determining the target pixel in accordance with the motion of a provisional target pixel of the input image signal.

30. The image processing device as claimed in claim 29, further comprising motion detecting means for detecting the motion of the provisional target pixel.

31. The image processing device as claimed in claim 25, wherein the operation means outputs an image signal including information about a lacking pixel included in the input image signal, as the output image signal.

32. The image processing device as claimed in claim 25, wherein the operation means outputs an image signal having less noise than the input image signal, as the output image signal.

33. The image processing device as claimed in claim 25, wherein the operation means outputs an image signal having a higher resolution than the input image signal, as the output image signal.

34. The image processing device as claimed in claim 25, wherein the operation means outputs an image signal having less distortion due to the aberration of a lens than the input image signal, as the output image signal.

35. An image processing method comprising:

a position detecting step of detecting position information indicating the position within a frame, of a target pixel of an input image signal consisting of a plurality of pixels;

a class tap selecting step of selecting a plurality of pixels from the input image signal as a class tap;

a class determining step of determining the class of the target pixel from a plurality of classes in accordance with the class tap;

a prediction tap selecting step of selecting a plurality of pixels having their positional relations with the target pixel varied in accordance with the position information, from the input image signal as a prediction tap; and an operation step of carrying out arithmetic processing based on conversion data obtained in advance by learning for each of the classes and the prediction tap, thus outputting an output image signal of higher quality than the input image signal.

36. A recording medium having recorded thereon a program for causing a computer to execute image processing, the program comprising:

a position detecting step of detecting position information indicating the position within a frame, of a target pixel of an input image signal consisting of a plurality of pixels;

a class tap selecting step of selecting a plurality of pixels from the input image signal as a class tap;

a class determining step of determining the class of the target pixel from a plurality of classes in accordance with the class tap;

a prediction tap selecting step of selecting a plurality of pixels having their positional relations with the target pixel varied in accordance with the position information, from the input image signal as a prediction tap; and an operation step of carrying out arithmetic processing based on conversion data obtained in advance by learning for each of the classes and the prediction tap, thus outputting an output image signal of higher quality than the input image signal.

37. An image processing device comprising:

provisional class tap selecting means for selecting a plurality of pixels from an input image signal as a provisional class tap, for each target pixel of the input image signal consisting of a plurality of pixels;

true class tap selecting means for selecting a plurality of pixels having their positional relations with the target pixel varied in accordance with the position of the provisional class tap within a frame, from the input image signal, as a true class tap;

class determining means for determining the class of the target pixel from a plurality of classes on the basis of the true class tap;

prediction tap selecting means for selecting a plurality of pixels from the input image signal as a prediction tap; and operation means for carrying out arithmetic processing based on conversion data obtained in advance by learning for each of the classes and the prediction tap, thus outputting an output image signal of higher quality than the input image signal.

38. The image processing device as claimed in claim 37, wherein when each of a plurality of pixels of the provisional class tap is situated in an invalid image area in the frame, the true class tap selecting means selects, as the true class tap, pixels in an effective image area in the frame instead of the pixels situated in the invalid image area.

39. The image processing device as claimed in claim 37, wherein the true class tap selecting means selects the true class tap on the basis of the distance of the provisional class tap from the center of the frame.

40. The image processing device as claimed in claim 37, wherein the true class tap selecting means selects the true class tap on the basis of the provisional class tap and the position information indicating the position where a telop is inserted in the frame.

41. The image processing device as claimed in claim 37, further comprising target pixel determining means for determining the target pixel in accordance with the motion of a provisional target pixel of the input image signal.

42. The image processing device as claimed in claim 41, further comprising motion detecting means for detecting the motion of the provisional target pixel.

43. The image processing device as claimed in claim 37, wherein the operation means outputs an image signal including information about a lacking pixel included in the input image signal, as the output image signal.

44. The image processing device as claimed in claim 37, wherein the operation means outputs an image signal having less noise than the input image signal, as the output image signal.

45. The image processing device as claimed in claim 37, wherein the operation means outputs an image signal having a higher resolution than the input image signal, as the output image signal.

46. The image processing device as claimed in claim 37, wherein the operation means outputs an image signal having less distortion due to the aberration of a lens than the input image signal, as the output image signal.

47. An image processing method comprising:
a provisional class tap selecting step of selecting a plurality of pixels from an input image signal as a provisional class tap, for each target pixel of the input image signal consisting of a plurality of pixels;
a true class tap selecting step of selecting a plurality of pixels having their positional relations with the target pixel varied in accordance with the position of the provisional class tap within a frame, from the input image signal, as a true class tap;
a class determining step of determining the class of the target pixel from a plurality of classes on the basis of the true class tap;
a prediction tap selecting step of selecting a plurality of pixels from the input image signal as a prediction tap; and
an operation step of carrying out arithmetic processing based on conversion data obtained in advance by learning for each of the classes and the prediction tap, thus outputting an output image signal of higher quality than the input image signal.

48. A recording medium having recorded thereon a program for causing a computer to execute image processing, the program comprising:
a provisional class tap selecting step of selecting a plurality of pixels from an input image signal as a provisional class tap, for each target pixel of the input image signal consisting of a plurality of pixels;
a true class tap selecting step of selecting a plurality of pixels having their positional relations with the target pixel varied in accordance with the position of the provisional class tap within a frame, from the input image signal, as a true class tap;
a class determining step of determining the class of the target pixel from a plurality of classes on the basis of the true class tap;
a prediction tap selecting step of selecting a plurality of pixels from the input image signal as a prediction tap; and
an operation step of carrying out arithmetic processing based on conversion data obtained in advance by learning for each of the classes and the prediction tap, thus outputting an output image signal of higher quality than the input image signal.

49. An image processing device comprising:
class tap selecting means for selecting a plurality of pixels from an input image signal as a class tap, for each target pixel of the input image signal consisting of a plurality of pixels;
class determining means for determining the class of the target pixel from a plurality of classes on the basis of the class tap;
provisional prediction tap selecting means for selecting a plurality of pixels for said each target pixel from the input image signal as a provisional prediction tap;
true prediction tap selecting means for selecting a plurality of pixels having their positional relations with the target pixel varied in accordance with the position of the provisional prediction tap within a frame, from the input image signal as a true prediction tap; and
operation means for carrying out arithmetic processing based on conversion data obtained in advance by learning for each of the classes and the true prediction tap, thus outputting an output image signal of higher quality than the input image signal.

50. The image processing device as claimed in claim 49, wherein when each of a plurality of pixels of the provisional prediction tap is situated in an invalid image area in the frame, the true prediction tap selecting means selects, as the true prediction tap, pixels in an effective image area in the frame instead of the pixels situated in the invalid image area.

51. The image processing device as claimed in claim 49, wherein the true prediction tap selecting means selects the true prediction tap on the basis of the distance of the provisional prediction tap from the center of the frame.

52. The image processing device as claimed in claim 49, wherein the true prediction tap selecting means selects the true prediction tap on the basis of the provisional prediction tap and the position information indicating the position where a telop is inserted in the frame.

53. The image processing device as claimed in claim 49, further comprising target pixel determining means for determining the target pixel in accordance with the motion of a provisional target pixel of the input image signal.

54. The image processing device as claimed in claim 53, further comprising motion detecting means for detecting the motion of the provisional target pixel.

55. The image processing device as claimed in claim 49, wherein the operation means outputs an image signal including information about a lacking pixel included in the input image signal, as the output image signal.

56. The image processing device as claimed in claim 49, wherein the operation means outputs an image signal having less noise than the input image signal, as the output image signal.

57. The image processing device as claimed in claim 49, wherein the operation means outputs an image signal having a higher resolution than the input image signal, as the output image signal.

58. The image processing device as claimed in claim 49, wherein the operation means outputs an image signal having less distortion due to the aberration of a lens than the input image signal, as the output image signal.

59. An image processing method comprising:
a class tap selecting step selecting a plurality of pixels from an input image signal as a class tap, for each target pixel of the input image signal consisting of a plurality of pixels;
a class determining step of determining the class of the target pixel from a plurality of classes on the basis of the class tap;
a provisional prediction tap selecting step of selecting a plurality of pixels for said each target pixel from the input image signal as a provisional prediction tap;
a true prediction tap selecting step of selecting a plurality of pixels having their positional relations with the target pixel varied in accordance with the position of the provisional prediction tap within a frame, from the input image signal as a true prediction tap; and
an operation step of carrying out arithmetic processing based on conversion data obtained in advance by learning for each of the classes and the true prediction tap, thus outputting an output image signal of higher quality than the input image signal.

60. A recording medium having recorded thereon a program for causing a computer to execute image processing, the program comprising:

a class tap selecting step selecting a plurality of pixels from an input image signal as a class tap, for each target pixel of the input image signal consisting of a plurality of pixels;

a class determining step of determining the class of the target pixel from a plurality of classes on the basis of the class tap;

a provisional prediction tap selecting step of selecting a plurality of pixels for said each target pixel from the input image signal as a provisional prediction tap;

a true prediction tap selecting step of selecting a plurality of pixels having their positional relations with the target pixel varied in accordance with the position of the provisional prediction tap within a frame, from the input image signal as a true prediction tap; and an operation step of carrying out arithmetic processing based on conversion data obtained in advance by learning for each of the classes and the true prediction tap, thus outputting an output image signal of higher quality than the input image signal.

* * * * *